United States Patent
Nakao

(10) Patent No.: US 9,519,552 B2
(45) Date of Patent: Dec. 13, 2016

(54) IMAGE FORMING APPARATUS WHICH EXECUTES REBUILD PROCESSES

(71) Applicant: KONICA MINOLTA, INC., Chiyoda-ku, Tokyo (JP)

(72) Inventor: Takehisa Nakao, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/005,299

(22) Filed: Jan. 25, 2016

(65) Prior Publication Data

US 2016/0217048 A1   Jul. 28, 2016

(30) Foreign Application Priority Data

Jan. 27, 2015   (JP) ................... 2015-013434

(51) Int. Cl.
| | | |
|---|---|---|
| G06F 15/00 | (2006.01) | |
| G06F 11/16 | (2006.01) | |
| G06F 3/06 | (2006.01) | |
| H04N 1/32 | (2006.01) | |

(52) U.S. Cl.
CPC ......... *G06F 11/1662* (2013.01); *G06F 3/0619* (2013.01); *G06F 3/0647* (2013.01); *G06F 3/0683* (2013.01); *H04N 1/32561* (2013.01); *H04N 1/32673* (2013.01); *G06F 2201/805* (2013.01); *H04N 2201/0094* (2013.01)

(58) Field of Classification Search
USPC ................................. 348/1.13–1.15
See application file for complete search history.

(56) References Cited

U.S. PATENT DOCUMENTS

| | | | |
|---|---|---|---|
| 7,631,218 B2 | 12/2009 | Daikokuya et al. | |
| 2012/0198189 A1* | 8/2012 | Akiba ................ | H04N 1/32363 711/162 |
| 2013/0067275 A1 | 3/2013 | Watanabe et al. | |
| 2014/0082678 A1 | 3/2014 | Nagai et al. | |

FOREIGN PATENT DOCUMENTS

| | | |
|---|---|---|
| JP | 08221217 A | 8/1996 |
| JP | 2007094994 A | 4/2007 |
| JP | 2013058103 A | 3/2013 |
| JP | 2014059659 A | 4/2014 |

\* cited by examiner

*Primary Examiner* — Saeid Ebrahimi Dehkord
(74) *Attorney, Agent, or Firm* — Holtz, Holtz & Volek PC

(57) ABSTRACT

An image forming apparatus comprises a first and a second HDDs (Hard Disk Drives), a RAID (Redundant Arrays of Inexpensive Disks) controller to execute rebuilding processes in which data stored in the first HDD is copied to the second HDD restored, and a CPU (Central Processing Unit). When there arises the necessity for accessing from the CPU to at least of the first and the second HDDs, and the priority of data which is the object for access by the CPU is higher than the priority of data which is being processed under the rebuilding processes, the image forming apparatus stops the rebuilding processes. The image forming apparatus restarts the rebuilding processes, when the access from the CPU is finished.

12 Claims, 20 Drawing Sheets

FIG.6

PRIORITY TABLE

| KIND OF DATA | CPU ACCESS | REBUILDING |
|---|---|---|
| COPY | A | |
| SCAN to BOX | A | |
| BOX PRINT | B | |
| FAX | A | |
| PC PRINT | B | |
| NETWORK ACCESS | C | |
| ADDRESS BOOK | | B |
| BOX DATA | | C |
| FAX RECEIVE DATA | | B |
| PROGRAM | | B |

A>B>C

IMAGE FORMING APPARATUS WHICH EXECUTES REBUILD PROCESSES

This application is based on Japanese Patent Application No. 2015-13434 filed with the Japan Patent Office on Jan. 27, 2015, the entire content of which is hereby incorporated by reference.

BACKGROUND OF THE INVENTION

Field of the Invention

This invention relates to an image forming apparatus, a control program for the image forming apparatus, a controller, and a control program for the controller. More specifically, this invention relates to an image forming apparatus, a control program for the image forming apparatus, a controller, and a control program for the controller which execute rebuilding processes.

Description of the Related Art

According to improvement of high resolution of video data and image data, and networks proliferation etc., it is required to increase largely recording capacity for fixed storage devices such as a HDD (Hard Disk Drive), a SSD (Solid State Drive), or the like. It is required for an image forming apparatus with a fixed storage device, to read/write data fast (improve performance) and store data safely (improve the backup function).

In case that an image forming apparatus stores all the data in one fixed storage device, all the data may be lost by the occurrence of trouble in the fixed storage device. In particular, trouble can easily arise in HDDs, since HDDs have movable parts.

There are technologies of RAID (Redundant Arrays of Inexpensive Disks) using a plurality of fixed storage devices, to improve performance and the backup function of an image forming apparatus. RAID has a plurality of writing methods such as RAID0, RAID1, or the like.

RAID0 is a technique which is so called a striping. When data writing by RAID0, data is devided into a plurality of divided data pieces by the block. Each of a plurality of divided data pieces is written in the corresponding fixed storage device. When data reading by RAID0, the divided data pieces are read from each of a plurality of fixed storage devices in parallel. Herewith, writing speed for the fixed storage device can be improved, and the performance of the image forming apparatus can be improved.

RAID1 is a technique which is so called mirroring. When data writing by RAID1, data is copied. Each of same data pieces are written in a plurality of fixed storage devices. When data reading by RAID1, data pieces are read from only one normal fixed storage device, out of the plurality of fixed storage devices. Herewith, when trouble occurs at a fixed storage device out of a plurality of fixed storage devices, the data can be read from a normal fixed storage device. Therefore, the backup function of the image forming apparatus can be improved. In case one fixed storage device among a plurality of fixed storage devices which execute mirroring broke down, an image forming apparatus executes rebuilding processes. The rebuilding processes mean processes for copying data which had been stored in a fixed storage device which is working in a normal way, to the fixed storage device which was recovered from the failure (or, to a newly replaced fixed storage device).

In an image forming apparatus, a subject which executes rebuilding processes and a subject which accesses a fixed storage device (a subject which writes data into the fixed storage device or a subject which reads data from the fixed storage device) are different from each other. More specifically, a RAID controller typically executes rebuilding processes or processes relating to the RAID. On the other hand, a CPU (Central Processing Unit) which controls behavior of the entire image forming apparatus accesses the fixed storage device. The rebuilding processes are performed in the judgment of the RAID controller.

Documents 1 and 2 below disclose techniques related to rebuilding processes. According to document 1 below, when hosts do not request for accesses within a certain time during rebuilding processes for a HDD, the size of data to be processed on a rebuilding process becomes larger than the normal size of data to be processed on a rebuilding process. Herewith, it can shorten the time for rebuilding processes.

In Document 2 below, resources are allocated to rebuilding processes. In case that a predetermined process is requested during the rebuilding processes, remaining resources are allocated to the requested processes, based on determination whether there are enough remaining resources for executing the requested process or not.

[Document 1] Japan Patent Publication No. 2007-94994
[Document 2] Japan Patent Publication No. 2013-58103

A CPU accesses a fixed storage device, regardless of whether rebuilding processes are being executed or not. In consequence, when a CPU accesses a fixed storage device during rebuilding processes under the conventional technology, a data reading by a RAID controller from a fixed storage device which stores original data of the rebuilding processes may conflict with accesses by the CPU to the fixed storage device which stores original data of the rebuilding processes. Also, a data writing by a RAID controller to a fixed storage device which stores copied data of the rebuilding processes may conflict with accesses by the CPU to the fixed storage device which stores copied data of the rebuilding processes. This causes slowdowns on the access speed of the CPU to the fixed storage device. Hence, the processing may be delayed.

Especially, in case that an image forming apparatus is a MFP (Multifunction Peripheral), when a CPU of the MFP performs copy jobs, print jobs, scan jobs, or the like, the CPU writes image data to be processed into a fixed storage device, or reads image data to be processed from the fixed storage device. The transfer speed to the fixed storage device is slow, as compared with a working speed of an images processing circuit of the MFP. Hence, slowdowns of access speed to fixed storage device cause performance degradation of the MFP itself. More specifically, the access speed by a CPU to a HDD during the rebuilding processes decreases to about 40% of access speed by the CPU to the HDD when rebuilding processes are not performed.

SUMMARY OF THE INVENTION

This invention is achieved to solve the above problems. The object is to provide a sophisticated image forming apparatuse, a sophisticated control program for an image forming apparatus, a sophisticated controller, and a sophisticated control program for a controller.

According to one aspect of this invention, an image forming apparatus comprises: a first and a second fixed storage devices, a controller to execute rebuilding processes in which data being stored in the first fixed storage device is copied to the second fixed storage device, when the second fixed storage device failed is restored, a CPU (Central Processing Unit) to access each of the first and the second fixed storage devices, a determination unit to determine whether the rebuilding processes are being executed or not, when there arises the necessity for accessing from the CPU to at least of the first and the second fixed storage devices, a priority acquire unit to acquire a priority of data which is an object for access by the CPU and a priority of data which is being processed under the rebuilding processes, when the determination unit determined that the rebuilding processes are being executed, a priority determination unit to determine whether the priority of data which is the object for access by the CPU is higher than the priority of data which is being processed under the rebuilding processes or not, a stop unit to stop the rebuilding processes, when the priority determination unit determined that the priority of data which is the object for access by the CPU is higher than the priority of data which is being processed under the rebuilding processes, and a restart unit to restart the rebuilding processes, when the access from the CPU to at least one of the fixed storage devices was finished.

According to another aspect of this invention, a non-transitory computer-readable recording medium storing a controlling program for an image forming apparatus, wherein the image forming apparatus comprises: a first and a second fixed storage devices, a controller to execute rebuilding processes in which data being stored in the first fixed storage device is copied to the second fixed storage device, when the second fixed storage device failed is restored, and a CPU (Central Processing Unit) to access each of the first and the second fixed storage devices, wherein the controlling program causing a computer to execute the steps of: determine whether the rebuilding processes are being executed or not, when there arises the necessity for accessing from the CPU to at least of the first and the second fixed storage devices, acquire a priority of data which is an object for access by the CPU and a priority of data which is being processed under the rebuilding processes, when the determination unit determined that the rebuilding processes are being executed, determine whether the priority of data which is the object for access by the CPU is higher than the priority of data which is being processed under the rebuilding processes or not, stop the rebuilding processes, when the priority determination unit determined that the priority of data which is the object for access by the CPU is higher than the priority of data which is being processed under the rebuilding processes, and restart the rebuilding processes, when the access from the CPU to at least one of the fixed storage devices was finished.

According to another aspect of this invention, a controller which communicates with a CPU (Central Processing Unit) which access each of the first and the second fixed storage devices, wherein the controller comprises: a rebuild processor to execute rebuilding processes in which data being stored in the first fixed storage device is copied to the second fixed storage device, when the second fixed storage device failed is restored, a determination unit to determine whether the rebuilding processes are being executed or not, when there arises the necessity for accessing from the CPU to at least of the first and the second fixed storage devices, a priority acquire unit to acquire a priority of data which is an object for access by the CPU and a priority of data which is being processed under the rebuilding processes, when the determination unit determined that the rebuilding processes are being executed, a priority determination unit to determine whether the priority of data which is the object for access by the CPU is higher than the priority of data which is being processed under the rebuilding processes or not, a stop unit to stop the rebuilding processes, when the priority determination unit determined that the priority of data which is the object for access by the CPU is higher than the priority of data which is being processed under the rebuilding processes, and a restart unit to restart the rebuilding processes, when the access from the CPU to at least one of the fixed storage devices was finished.

According to another aspect of this invention, a non-transitory computer-readable recording medium storing a controlling program for a controller, wherein the controller communicates with a CPU (Central Processing Unit) which access each of the first and the second fixed storage devices, wherein the controlling program causing a computer to execute the steps of: execute rebuilding processes in which data being stored in the first fixed storage device is copied to the second fixed storage device, when the second fixed storage device failed is restored, determine whether the rebuilding processes are being executed or not, when there arises the necessity for accessing from the CPU to at least of the first and the second fixed storage devices, acquire a priority of data which is an object for access by the CPU and a priority of data which is being processed under the rebuilding processes, when the determination unit determined that the rebuilding processes are being executed, determine whether the priority of data which is the object for access by the CPU is higher than the priority of data which is being processed under the rebuilding processes or not, stop the rebuilding processes, when the priority determination unit determined that the priority of data which is the object for access by the CPU is higher than the priority of data which is being processed under the rebuilding processes, and restart the rebuilding processes, when the access from the CPU to at least one of the fixed storage devices was finished.

BRIEF DESCRIPTION OF THE DRAWINGS

FIG. 6 schematically shows a priority table, according to the second embodiment of this invention.

DESCRIPTION OF THE PREFERRED EMBODIMENTS

The embodiments of this invention will be explained below, based on the Figures.

In the embodiments below, the image forming apparatus is a MFP which has a scanner function, a copying function, a function of a printer, a facsimile function, a data transmitting function, and a server function. The image forming apparatus may be a facsimile device, a printer, a copying machine, or the like, other than a MFP.

In this description, the access to a fixed storage device means at least one of a data writing to the fixed storage device and a data reading from the fixed storage device.

In this description, the restart of rebuilding process includes a case in which a data coping is restarted to overwrite a part of or all of the data copied before stopping the rebuilding processes in the restored fixed storage device (the copy destination fixed storage device).

The First Embodiment

Firstly, the structure of an image forming apparatus according to this embodiment will be explained.

Figure 1:
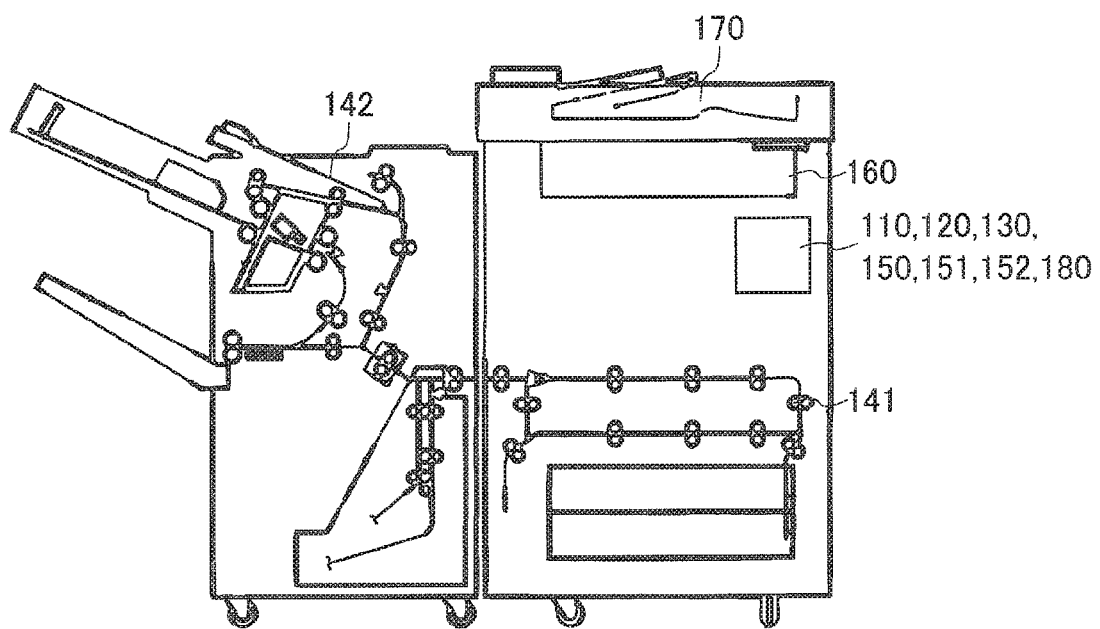
FIG. 1 roughly shows a cross sectional diagram of a structure of an image forming apparatus, according to the first embodiment of this invention.
Figure 2:
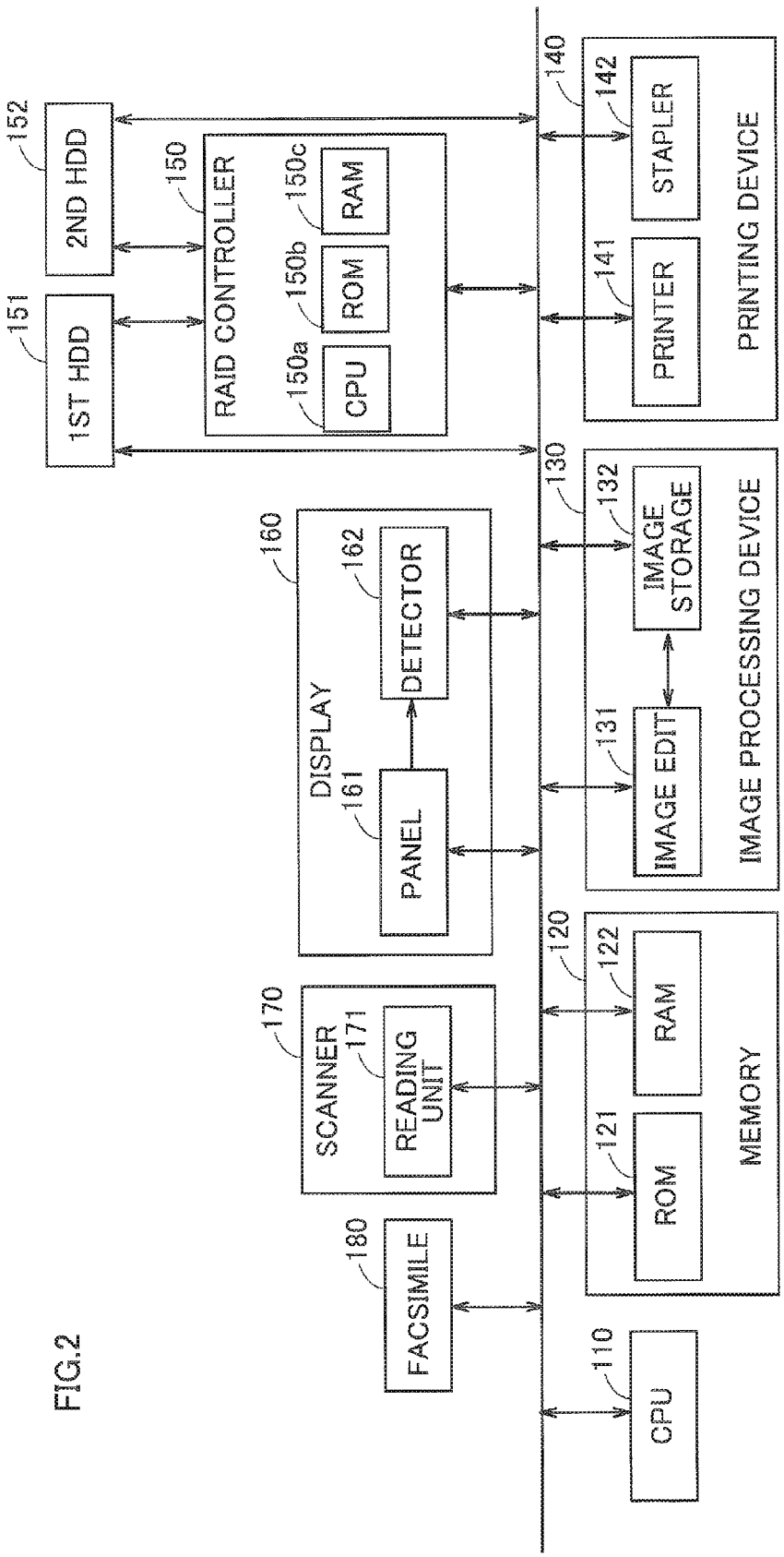
FIG. 2 shows a block diagram of a structure of an image forming apparatus, according to the first embodiment of this invention.

FIG. 1 roughly shows a cross sectional diagram of a structure of an image forming apparatus, according to the first embodiment of this invention. FIG. 2 shows a block diagram of a structure of the image forming apparatus, according to the first embodiment of this invention.

Referring to FIGS. 1 and 2, the image forming apparatus of the embodiment is equipped with CPU 110, memory 120, image processing device 130, printing device 140, RAID controller 150 (an example of a controller), first HDD 151 (an example of a first fixed storage device), second HDD 152 (an example of a second fixed storage device), displaying device 160, scanner device 170, and facsimile transmit and receive unit 180. CPU 110 and each of memory 120, image processing device 130, printing device 140, RAID controller 150, first HDD 151, second HDD 152, displaying device 160, scanner device 170 and facsimile transmit and receive unit 180 are connected with each other, to communice with each other.

CPU 110 controls behavior of the entire image forming apparatus. CPU 110 executes processes based on control programs. CPU 110 accesses each of first HDD 151 and second HDD 152 at required timing.

Memory 120 includes ROM (Read Only Memory) 121 and RAM (Random Access Memory) 122. ROM 121 stores control programs to be executed by CPU 110, various tables, and so on. RAM 122 is a working memory for CPU 110 and temporarily stores data related to various jobs.

Image processing device 130 includes image editing unit 131 for editing image data, and images storage unit 132 for storing image data.

Printing device 140 includes printing unit 141 for performing printing, and staple unit 142 for stapling sheets after the printing. Printing unit 141 is roughly configured with a toner image forming unit, a fixing device, a sheet conveying unit, and so on. Printing unit 141 forms images on sheets by using electrophotographic technology, for example. The toner image forming unit synthesizes 4-color images by using a so-called tandem system, and forms color images on sheets (recording media). The toner image forming unit is configured with photo conductors for C (cyan), M (magenta), Y (yellow) and K (black), a secondary transfer belt to which toner images are transferred (the first transfer) from the photo conductors, a transfer unit for transferring (second transfer) images from the secondary transfer belt to sheets, and so on. The fixing device has a heating roller and a pressure roller. The fixing device conveys sheets on which toner images were formed, by the heating roller and the pressure roller with pinching the sheets, to apply heat and pressure on the sheets. Herewith, the fixing device melts toner adhered to the sheets and fixes it on the sheets to form images on the sheets. The sheet conveying unit is configured with paper feeding rollers, conveying rollers, motors for driving the rollers, and so on. The sheet conveying unit feeds sheets from a paper feeding cartridge to convey the sheets in the inner part of the chassis of the image forming apparatus. The sheet conveying unit discharges sheets on which images were formed, from the chassis of the image forming apparatus onto a copy receiving tray or the like.

RAID controller 150 can execute mirroring processes or rebuilding processes at required timing, by using first HDD 151 and second HDD 152. In the mirroring process, data stored in one of first HDD 151 and second HDD 152 are copied to the other of first HDD 151 and second HDD 152. RAID controller 150 includes CPU 150a for controlling processes performed by RAID controller 150 and ROM 150b for storing control programs executed by CPU 150a, RAM 150c which is a working memory of CPU 150a, and so on.

First HDD 151 and second HDD 152 store various data. First HDD 151 and second HDD 152 work, being independent of each other. CPU 110 accesses first HDD 151 and second HDD 152 via RAID controller 150. First HDD 151 and second HDD 152 may be external devices attached to the image forming apparatus.

Displaying device 160 includes display panel 161 for displaying various information, and detection unit 162 for detecting input operations to the display panel.

Scanner device 170 reads document images and generates the image data. Scanner device 170 includes reading device 171 to read document images.

Facsimile transmit and receive unit 180 performs data transmitting and receiving by using facsimile.

The rebuilding processes to be performed by RAID controller 150 in the embodiment will be explained.

Figure 3:
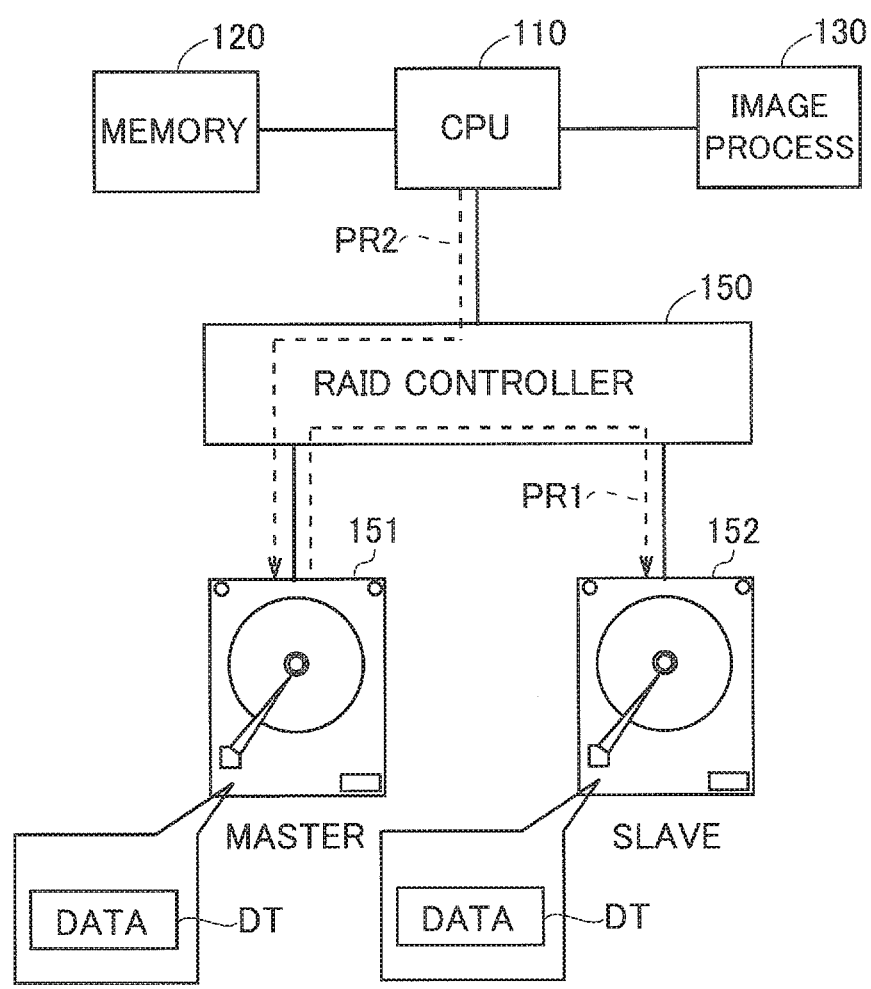
FIG. 3 is for explanation pertaining to rebuilding processes executed by RAID controller 150, according to the first embodiment of this invention.

FIG. 3 is for explanation pertaining to rebuilding processes executed by RAID controller 150, according to the first embodiment of this invention. In the following explanations, first HDD 151 shall be a master (which stores original data), and second HDD 152 shall be a slave (a copy destination which stores copied data).

Referring to FIG. 3, RAID controller 150 executes mirroring processes at required timing by using first HDD 151 and second HDD 152. In consequence, first HDD 151 and second HDD 152 store same data DT.

In case that second HDD 152 breaks down, an administrator or a serviceman or the like of the image forming apparatus may repair the beoken second HDD 152 or replace the beoken second HDD 152 with a new HDD. Herewith, second HDD 152 is recovered. When second HDD 152 is recovered, RAID controller 150 executes rebuilding processes. More specifically. RAID controller 150 copies data DT stored in first HDD 151 which is working in a normal way, to recovered second HDD 152, as shown by arrow PR1.

On the other hand, as shown by arrow PR2, CPU 110 accesses each of first HDD 151 and second HDD 152 at required timing, regardless of whether rebuilding processes are being executed or not.

Next, the behavior of the image forming apparatus of the embodiment will be explained.

Figure 4:
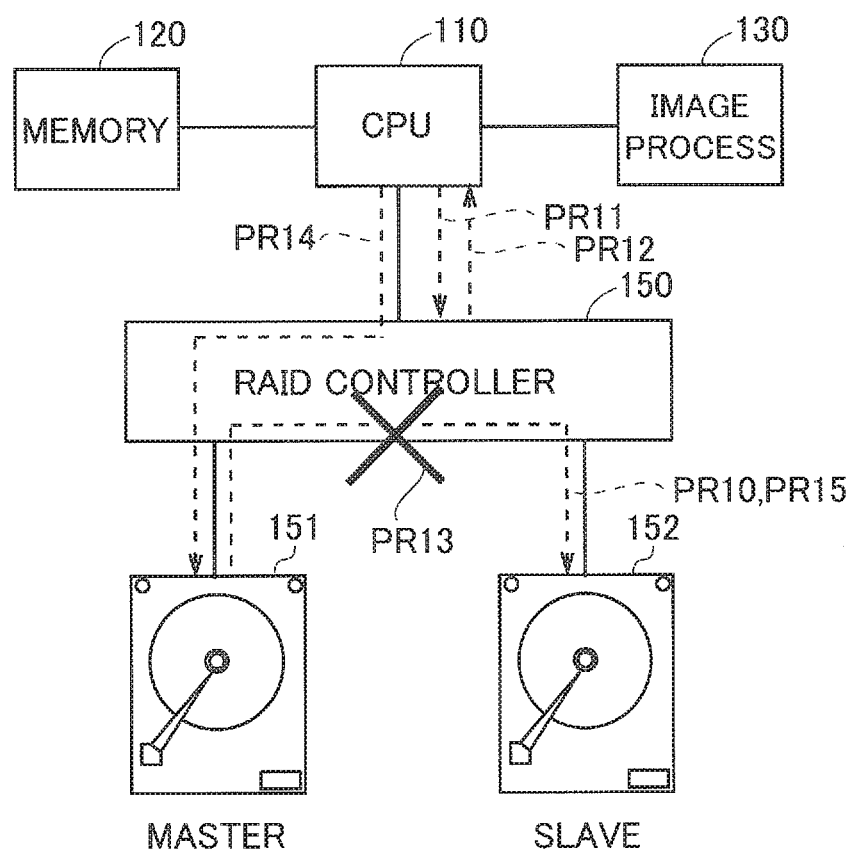
FIG. 4 is for explanation pertaining to behavior of the image forming apparatus, according to the first embodiment of this invention.

FIG. 4 is for explanation pertaining to behavior of the image forming apparatus, according to the first embodiment of this invention.

Referring to FIG. 4, RAID controller 150 is executing rebuilding processes for copying data from first HDD 151 to second HDD 152, as indicated by arrow PR10. During this rebuilding processes, when CPU 110 has to access at least one of first HDD 151 and second HDD 152, CPU 110 requests RAID controller 150 to transmit information (hereinafter, it may be referred to as status) which shows whether rebuilding processes are being performed or not, as indicated by arrow PR11. RAID controller 150 transmits the status to CPU 110 in response to the request from CPU 110, as shown by arrow PR12.

CPU 110 determines whether the rebuilding processes are being performed or not, based on the status received from RAID controller 150. When the rebuilding processes are being performed, CPU 110 requests RAID controller 150 to stop the rebuilding processes. RAID controller 150 stops the rebuilding processes in response to the request from CPU 110, as shown by arrow PR13.

After stopping the rebuilding processes by RAID controller 150, CPU 110 access a necessary HDD as shown by arrow PR14 (The necessary HDD shall be at least one of first HDD 151 and second HDD 152. In the following explanations, it is assumed that the necessary HDD is first HDD 151). After accessing the necessary HDD, CPU 110 requests RAID controller 150 to restart the rebuilding processes. RAID controller 150 restarts the rebuilding processes in response to the request from CPU 110, as shown by arrow PR15.

Figure 5:
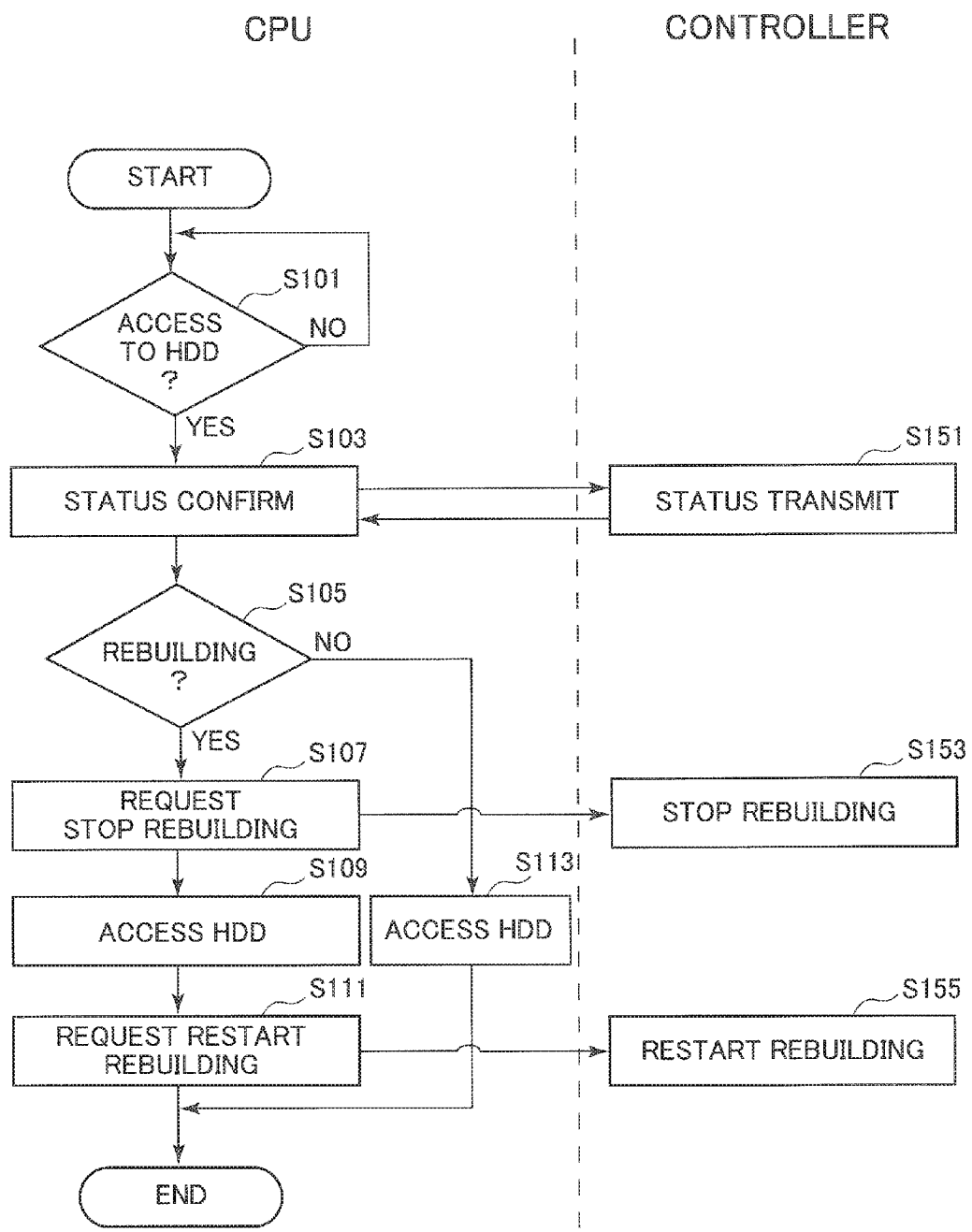
FIG. 5 shows a flowchart of behavior of the image forming apparatus, according to the first embodiment of this invention.

FIG. 5 shows a flowchart of behavior of the image forming apparatus, according to the first embodiment of this invention.

Referring to FIG. 5, CPU 110 determines whether there arises the necessity for accessing at least one of first HDD 151 and second HDD 152 or not (S101). Until there arises the necessity for accessing at least one of first HDD 151 and second HDD 152, CPU 110 continues the process of step S101.

When there arises the necessity for accessing at least one of first HDD 151 and second HDD 152 (YES at S101), CPU 110 checks the status of RAID controller 150 (S103). CPU 150a of RAID controller 150 transmits the status in response to the request of CPU 110 (S151). After the process of S103, CPU 110 determines whether rebuilding processes are being executed or not, based on the status (S105).

In case that rebuilding processes are being executed (YES at S105), CPU 110 requests RAID controller 150 to stop the rebuilding processes (S107). CPU 150a of RAID controller 150 stops the rebuilding processes in response to the request of CPU 110 (S153). After the process of step S107, CPU 110 accesses the necessary HDD (S109), requests RAID controller 150 to restart the rebuilding processes (S111), and terminates the process. CPU 150a of RAID controller 150 restarts the rebuilding processes in response to the request of CPU 110 (S155).

In case that rebuilding processes are not being executed (NO at S105), CPU 110 accesses the necessary HDD (S113), and terminates the process.

According to the embodiment, when CPU 110 accesses a HDD, CPU 110 determines whether rebuilding processes are being executed or not. In case rebuilding processes are being executed, CPU 110 requests RAID controller 150 to stop the rebuilding processes. CPU 110 accesses the necessary HDD after the rebuilding processes stops. After the accessing the necessary HDD was finished, CPU 110 requests RAID controller 150 to restart the rebuilding processes. Herewith, access speed degradation of CPU 110 to HDDs during rebuilding processes and performance degradation of the image forming apparatus can be prevented. The sophisticated image forming apparatus can be provided.

The Second Embodiment

According to the embodiment, when there arises the necessity for accessing at least one of first HDD 151 and second HDD 152 during rebuilding processes, CPU 110 compares priorities based on a priority table. More specifically, CPU 110 compares the priority of data which is the object for the access for the necessary HDD to be accessed, with the priority of data which is being processed under the rebuilding processes. CPU 110 requests to stop the rebuilding processes, in case that the priority of data which is the object for the access for the necessary HDD to be accessed is higher than the priority of data which is being processed under the rebuilding processes.

FIG. 6 schematically shows a priority table, according to the second embodiment of this invention. In FIG. 6, the priority becomes lower in the order of A, B and C.

Referring to FIG. 6, this priority table shows the priorities of data which are the objects for access to the HDD to be accessed by CPU 110 and the priorities of data to be processed under the rebuilding processes. In the embodiment, the priority table is stored in ROM 121.

According to the priority table, among data which are the objects for the access for the HDDs to be accessed by CPU 110, "COPY" (data of copy jobs), "SCAN to BOX" (image data which are objects for storing jobs to store scanned image data into BOX areas in HDDs), and "FAX" (data which are objects for facsimile transmitting or receiving jobs) have the priorities labelled as "A". These data should be stored quickly into HDDs. Hence, the priority is the highest. "BOX PRINT" (data which are objects for printing jobs to print data stored in BOX areas in HDDs), and "PC PRINT" (data which are objects for printing jobs to print data received from logged in PC) have the priorities labelled as "B". "NETWORK ACCESS" (data received via networks from external devices) has the priority labelled as "C", since the necessity for quick storing of data received via networks from external devices into HDDs is lower than the other data.

According to the priority table, among data which are objects for rebuilding processes, "ADDRESS BOOK", "FAX RECEIVING DATA" (data received during facsimile receiving jobs), and "PROGRAM" have the priorities labelled as "B". "BOX DATA" (data stored in BOX areas in HDDs) have the priority labelled as "C", since it is supposed that the frequency of use and importance of data stored in BOX areas in HDDs are lower than the other data.

In case that the priority of data which is the object for the necessary HDD to be accessed is higher than the priority of data which is being processed under the rebuilding processes, CPU 110 stops the rebuilding processes. On the other hand, in case that the priority of data which is the object for the necessary HDD to be accessed is as same as or lower than the priority of data which is being processed under the rebuilding processes, CPU 110 does not stop the rebuilding processes. In this instance, CPU 110 accesses the necessary HDD in parallel with the rebuilding processes.

Figure 7:
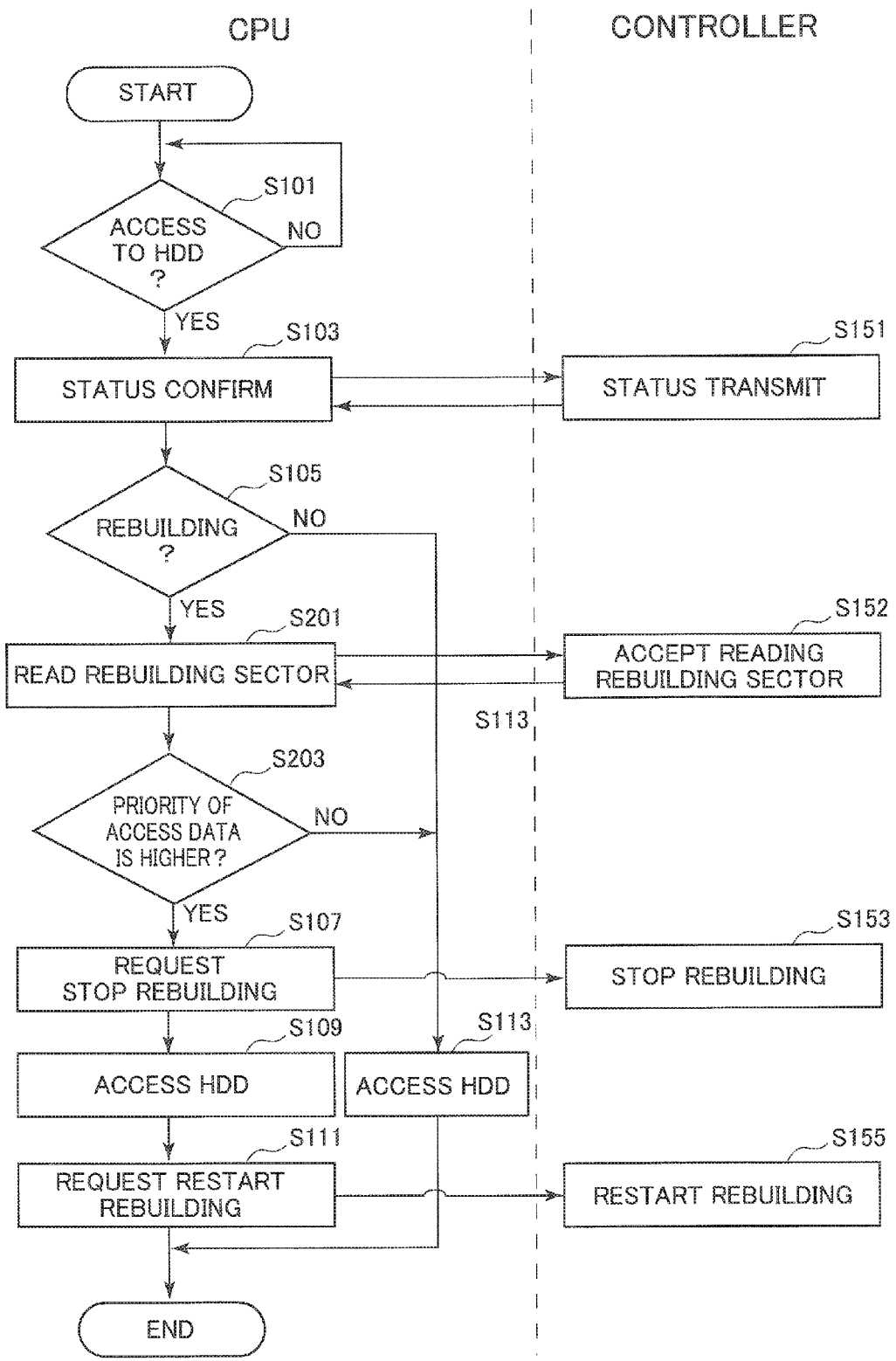
FIG. 7 shows a flowchart of behavior of the image forming apparatus, according to the second embodiment of this invention.

FIG. 7 shows a flowchart of behavior of the image forming apparatus, according to the second embodiment of this invention.

Referring to FIG. 7, CPU 110 firstly executes the processes same as steps S101 to S105 in the flowchart of FIG. 5.

In case that the rebuilding processes are being executed (YES at S105), CPU 110 reads data of sectors which are being processed under the rebuilding processes (S201). In response to the request of CPU 110, CPU 150a of RAID controller 150 accepts reading data of the sectors which are being processed under the rebuilding processes (S152). After the process of step S201, CPU 110 identifies a kind of data which is the object for accessing the necessary HDD and a kind of data of the sector which is being processed under the rebuilding processes. CPU 110 determines priorities correspond to the kinds identified, based on the priority table. CPU 110 determines whether the priority of data which is the object for the necessary HDD to be accessed is higher than the priority of data which is being processed under the rebuilding processes or not, based on the identified priorities (S203).

At step S203, in case that the priority of data which is the object for the necessary HDD to be accessed is higher than the priority of data which is being processed under the rebuilding processes (YES at S203), CPU 110 executes processes of step S107 and the following steps.

At step S203, in case that the priority of data which is the object for the necessary HDD to be accessed is same as or lower than the priority of data which is being processed under the rebuilding processes (NO at S203), CPU 110 executes processes of step S113 and the following steps.

Since the structure of the image forming apparatus and behavior other than the above of this embodiment are similar to the first embodiment, the explanation is not repeated.

This embodiment has a similar effect to the first embodiment. In addition, CPU 110 determines whether the rebuilding processes should be stopped or not, based on the priority of data which is the object for the HDD to be accessed and the priority of data which is being processed under the rebuilding processes. The access speed to HDDs by CPU 110 and the speed of the rebuilding processes are harmonized, and unnecessary stops of rebuilding processes can be avoided.

The Third Embodiment

According to the first and the second embodiments, CPU 110 proactively stops and restarts the rebuilding processes or the like. According to this third embodiment, RAID controller 150 proactively stops and restarts the rebuilding processes or the like.

Figure 8:
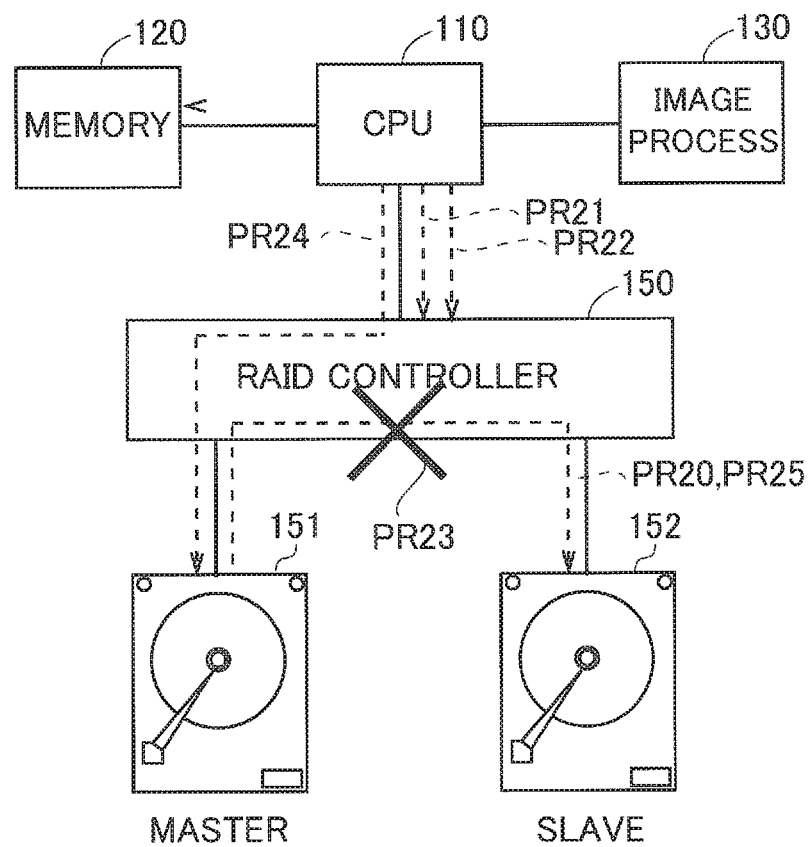
FIG. 8 is for explanation pertaining to behavior of the image forming apparatus, according to the third embodiment of this invention.

FIG. 8 is for explanation pertaining to behavior of the image forming apparatus, according to the third embodiment of this invention.

Referring to FIG. 8, as shown by arrow PR20, RAID controller 150 is executing the rebuilding processes in which data are copied from first HDD 151 to second HDD 152. In the rebuilding processes, when there arises the necessity for CPU 110 to access at least one of first HDD 151 or second HDD 152, CPU 110 requests RAID controller 150 to access the necessary HDD, as shown by arrow PR21. CPU 110 informs RAID controller 150 of the kind of data (an example of information for indicating a priority) which is the object for accessing the necessary HDD, as shown by arrow PR22.

When receiving the request to access the necessary HDD from CPU 110, RAID controller 150 identifies the priority of data which is the object for the HDD to be accessed by CPU 110, using the priority table. RAID controller 150 compares the identified priority and the priority of data which is being processed under the rebuilding processes. The priority table is preferably stored in ROM 150b in RAID controller 150 (FIG. 2). In case that the priority of data which is the object for the HDD to be accessed by CPU 110 is higher, RAID controller 150 stops the rebuilding processes as shown by arrow PR23.

After RAID controller 150 stops the rebuilding processes, CPU 110 accesses the necessary HDD, as shown by arrow PR24. After finishing the access to the necessary HDD, RAID controller 150 restarts the rebuilding processes, as shown by arrow PR25.

Figure 9:
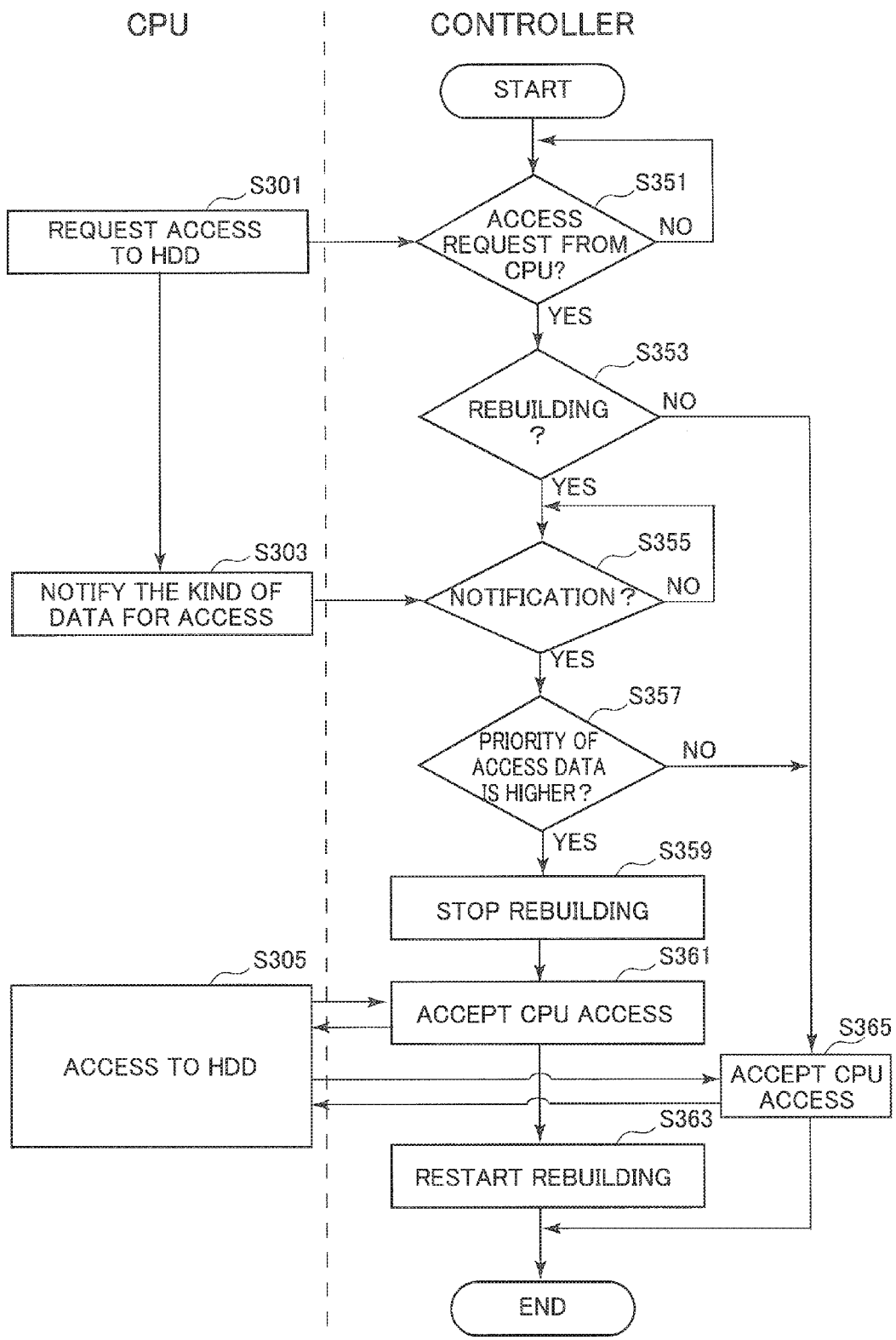
FIG. 9 shows a flowchart of behavior of the image forming apparatus, according to the third embodiment of this invention.

FIG. 9 shows a flowchart of behavior of the image forming apparatus, according to the third embodiment of this invention.

Referring to FIG. 9, in case that there arises the necessity for accessing at least one of first HDD 151 and second HDD 152, CPU 110 requests CPU 150a of RAID controller 150 to access the necessary HDD (S301). Next, CPU 110 identifies the kind of data which is the object for the necessary HDD to be accessed, and informs CPU 150a of the kind identified (S303).

At step S303, CPU 110 may inform CPU 150a of the priority as substitute for the kind of data which is the object for the necessary HDD to be accessed. In case that the priority of data is informed, the priority table of FIG. 6 is preferably also stored in ROM 121 (FIG. 2).

CPU 150a determines whether a request for accessing the HDD is received from CPU 110 or not (S351). Until the request for accessing the HDD is received from CPU 110, CPU 150a continues the process of step S351.

In case that the request for accessing the HDD is received from CPU 110 (YES at S351), CPU 150a determines whether the rebuilding processes are being performed or not (S353).

In case that the rebuilding processes are being performed (YES at S353). CPU 150a determines whether a notification of the kind of data which is the object for accessing the HDD by CPU 110 is received from CPU 110 or not (S355). Until the notification of the kind of data is received from CPU 110, CPU 150a continues the process of step S355.

In case that the notification of the kind of data is received from CPU 110 (YES at S355), CPU 150a identifies the priority of the kind of data received from CPU 110 based on the priority table. CPU 150a identifies the kind of data of sectors which are being processed under the rebuilding processes, and determines the priority corresponding to the kind identified based on the priority table. CPU 150a determines whether the priority of data which is the object for the HDD to be accessed by CPU 110 is higher than the priority of data which is being processed under the rebuilding processes or not (S357).

In case that the priority of data which is the object for the HDD to be accessed by CPU 110 is higher than the priority of data which is being processed under the rebuilding processes (YES at S357), CPU 150a stops the rebuilding processes (S359), and accepts the access to the necessary HDD by CPU 110 (S361). CPU 110 accesses the necessary HDD (S305). Next, CPU 150a restarts the rebuilding processes (S363), and terminates the process.

In case that the rebuilding processes are not performed (NO at S353) or the priority of data which is the object for the HDD to be accessed by CPU 110 is same as or lower than the priority of data which is being processed under the rebuilding processes (NO at S357), CPU 150a accepts the accessing HDD from CPU 110 (S365). CPU 110 accesses the necessary HDD (S305). After that, CPU 150a terminates the process.

Since the structure of the image forming apparatus and behavior other than the above of this embodiment are similar to the first and the second embodiments, the explanation is not repeated.

The Fourth Embodiment

In this embodiment, the case that an image forming apparatus stops the rebuilding processes and accesses the necessary HDD with executing various jobs.

Figure 10:
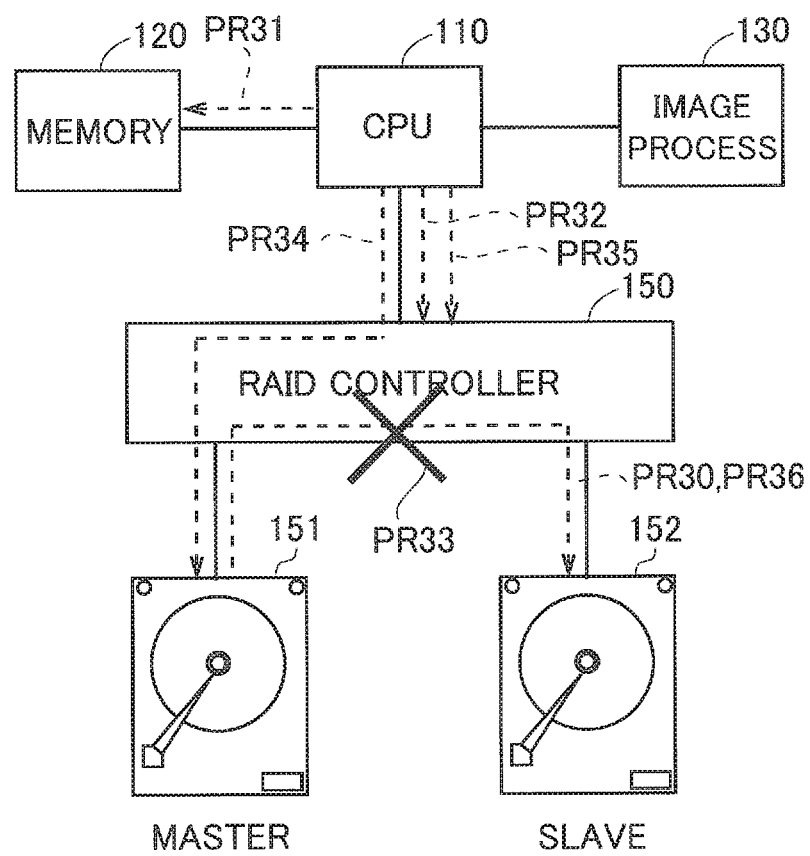
FIG. 10 is for explanation pertaining to behavior of the image forming apparatus when the image forming apparatus performs a writing job, according to the fourth embodiment of this invention.

FIG. 10 is for explanation pertaining to behavior of the image forming apparatus when the image forming apparatus performs a writing job, according to the fourth embodiment of this invention.

Referring to FIG. 10, RAID controller 150 is performing rebuilding processes for copying data from first HDD 151 to second HDD 152, as shown by arrow PR30.

CPU 110 is executing a writing job during the rebuilding processes. A writing job is to write data in at least one of first HDD 151 and second HDD 152. More specifically, a writing job means a copy job, a scan job, a facsimile receiving job, a box storing job, or the like.

CPU 110 stores the data to be written, in memory 120, in units of bands or pages, as shown by arrow PR31. In case that the writing job is a copy job or a scan job, writing data to be stored are image data of read documents. In case that the writing job is a facsimile receiving job, writing data to be stored are data received via facsimile. In case that the writing job is a box storing job, writing data to be stored are data which are objects for box storing.

In case that the remaining amount (the amount of a spare capacity) of memory 120 becomes less than threshold value T1 by storing the writing data, CPU 110 determines that there arises the necessity for CPU 110 to access at least one of first HDD 151 and second HDD 152. CPU 110 requests RAID controller 150 to transmit the status, as shown by arrow PR32. Next, CPU 110 determines whether the rebuilding processes are being executed or not, based on the status received from RAID controller 150. CPU 110 requests RAID controller 150 to stop the rebuilding processes, when the rebuilding processes are being executed.

RAID controller 150 stops the rebuilding processes in response to the request of CPU 110, as shown by arrow PR33.

After RAID controller 150 stopped the rebuilding processes, CPU 110 accesses the necessary HDD (first HDD 151 in this embodiment), as shown by arrow PR34. Herewith, CPU 110 transmits writing data stored in memory 120 to the necessary HDD. CPU 110 erases the writing data which was transferred to the HDD, on memory 120.

After the transferring writing data from memory 120 to the HDD is completed, CPU 110 requests RAID controller 150 to restart the rebuilding processes, as shown by arrow PR35. RAID controller 150 restarts the rebuilding processes in response to the request of CPU 110, as shown by arrow PR36.

After the transferring writing data from memory 120 to the HDD, the remaining amount of memory 120 increases to the level being more than or equal to threshold value T2(>=T1). In this instance, when there is unprocessed writing data (writing data which is not stored in memory 120 or HDDs), CPU 110 returns to the process shown by arrow PR31 and repeats the same behavior.

Figure 11:
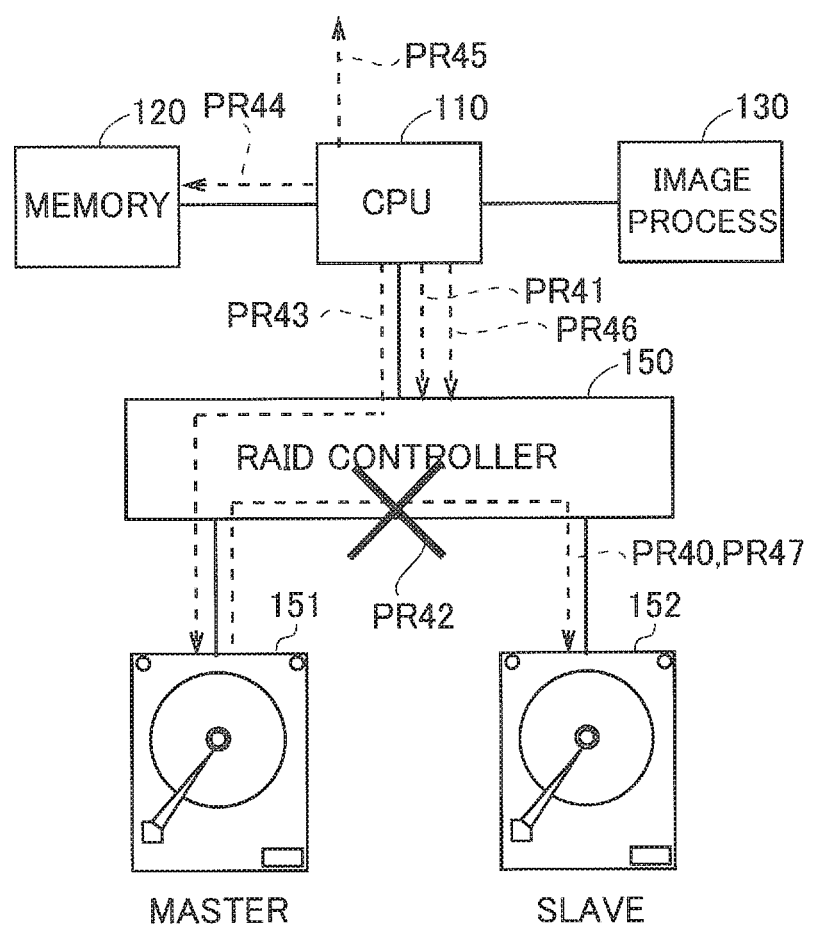
FIG. 11 is for explanation pertaining to behavior of the image forming apparatus when the image forming apparatus performs a reading job, according to the fourth embodiment of this invention.

FIG. 11 is for explanation pertaining to behavior of the image forming apparatus when the image forming apparatus performs a reading job, according to the fourth embodiment of this invention.

Referring to FIG. 11, RAID controller 150 is performing the rebuilding processes in which data are copied from first HDD 151 to second HDD 152, as shown by arrow PR40.

CPU 110 begins a reading job during the rebuilding processes. The reading job includes a reading process to read data from at least one of first HDD 151 and second HDD 152. More specifically, a reading job is a print job, a facsimile transmitting job, a data transmitting job from a box, or the like.

In case that the reading job is begun, CPU 110 determines that there arises the necessity for accessing at least one of first HDD 151 and second HDD 152. CPU 110 requests RAID controller 150 to transmit the status, as shown by arrow PR41. Next, CPU 110 determines whether the rebuilding processes are being executed or not, based on the status received from RAID controller 150. In case that the rebuilding processes are being executed, CPU 110 requests the controller to stop the rebuilding processes.

RAID controller 150 stops the rebuilding processes in response to the request of CPU 110, as shown by arrow PR42.

After RAID controller 150 stops the rebuilding processes, CPU 110 accesses the necessary HDD. Herewith, CPU 110 reads reading data from the necessary HDD to memory 120 in units of bands or pages, as shown by arrows PR43 and PR44. When the reading job is a print job, the reading data to be read is image data to be printed. When the reading job is a facsimile transmitting job, reading data to be read is data to be transmitted via facsimile. When the reading job is a data transmitting job from a box, the reading data to be read is data which are objects for transmitting in the box.

In case that the remaining amount of memory 120 becomes less than threshold value T3 by storing the reading data, CPU 110 stops reading data from the HDD to memory 120. In this instance, CPU 110 outputs the reading data which was stored in memory 120, as shown by arrow PR45. CPU 110 erases the reading data which was output, on memory 120. CPU 110 requests RAID controller 150 to restart the rebuilding processes, as shown by arrow PR46.

RAID controller 150 restarts the rebuilding processes in response to the request of CPU 110, as shown by arrow PR47.

When outputting reading data which was stored in memory 120 progresses, the remaining amount of memory 120 increases to the level being more than or equal to threshold value T4(>=T3). In this instance, in case that there are unprocessed reading data (reading data which were not stored in memory 120), CPU 110 returns to the process shown by arrow PR41, and stops the rebuilding processes again. Next, CPU 110 repeats the same behavior.

Figure 12:
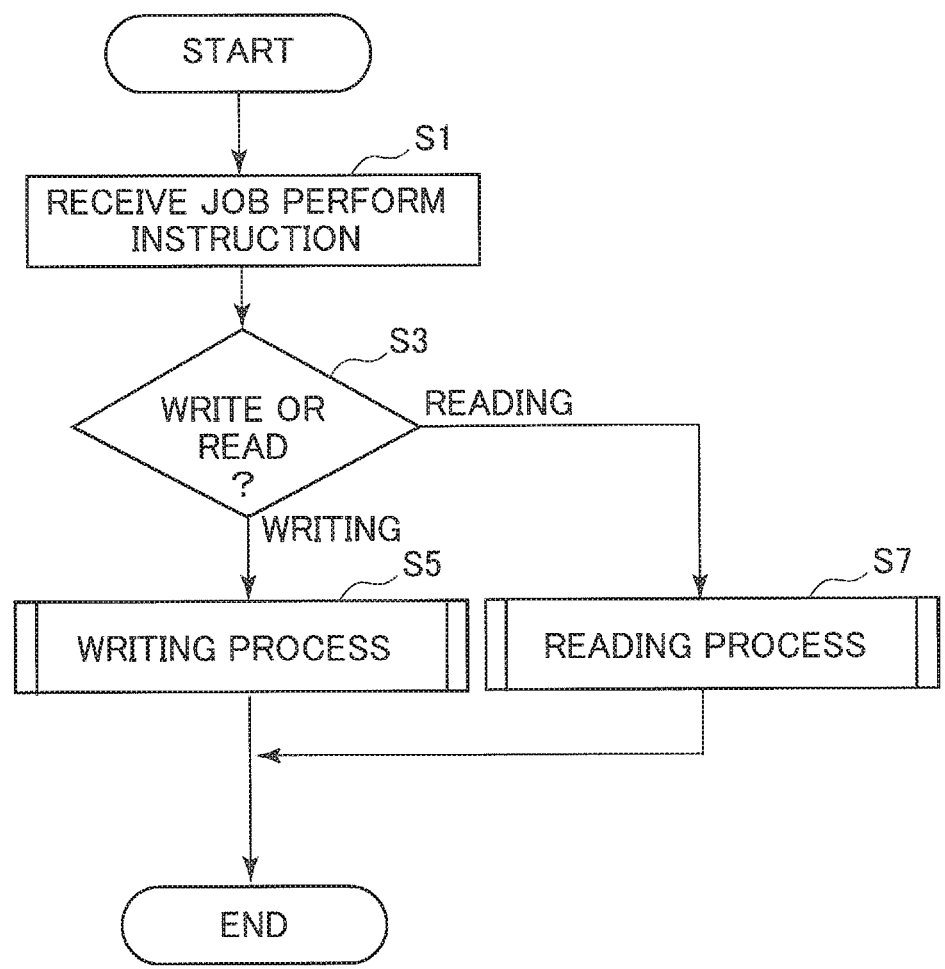
FIG. 12 shows a flowchart of behavior of the image forming apparatus, according to the fourth embodiment of this invention.

FIG. 12 shows a flowchart of behavior of the image forming apparatus, according to the fourth embodiment of this invention.

Referring to FIG. 12, when an instruction of performing a job is received (S1), CPU 110 determines whether the kind of the received job is a writing job or a reading job (S3).

At step S3, in case that the kind of the received job is a writing job ("WRITING" in S3), CPU 110 executes writing process (S5), and terminates the process.

At step S3, in case that the kind of the received job is a reading job ("READING" in S3), CPU 110 executes reading process (S7), and terminates the process.

Figure 13:
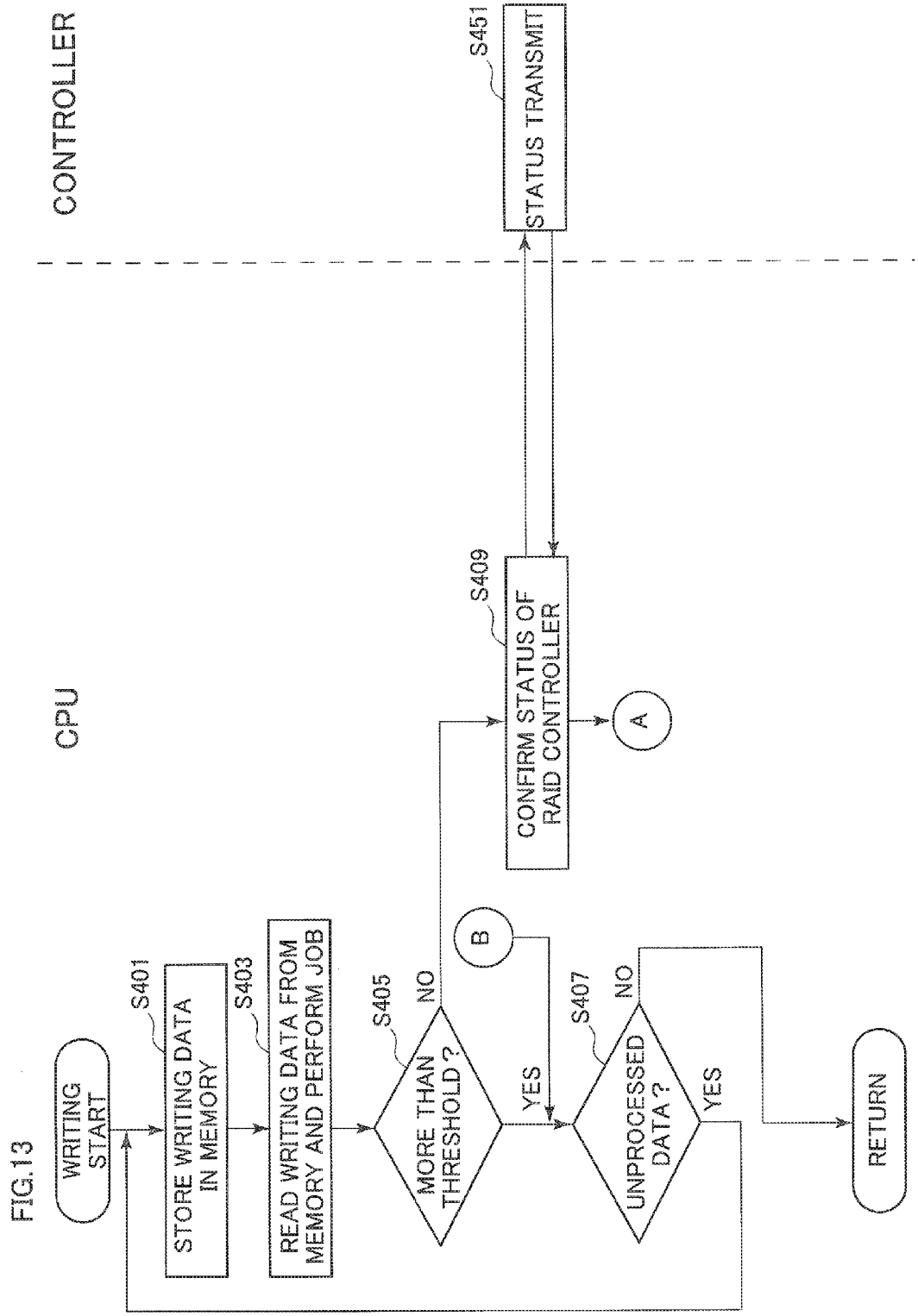
FIG. 13 shows the first part of the subroutine of the writing process (S5) in FIG. 12.
Figure 14:
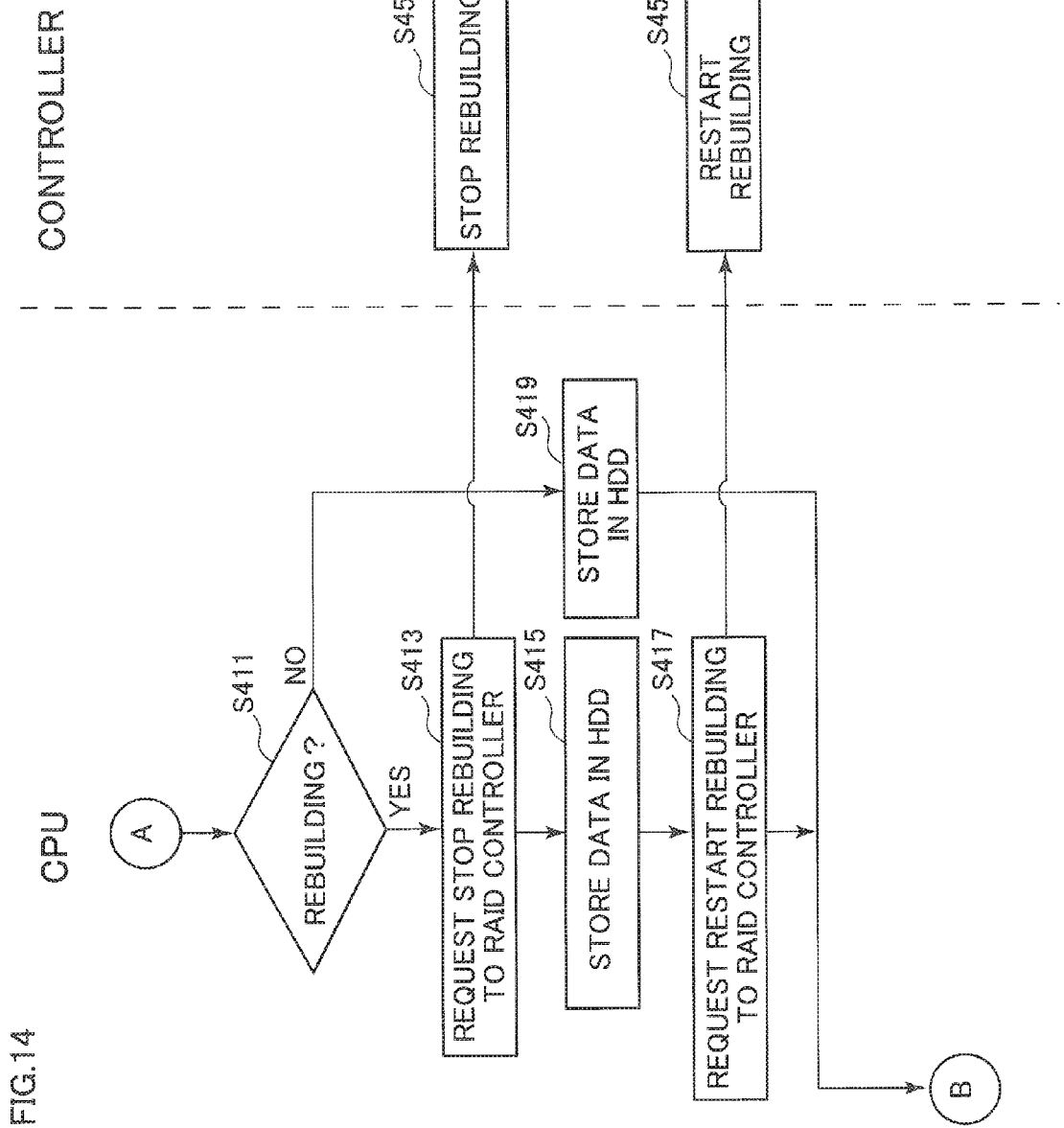
FIG. 14 shows the second part of the subroutine of the writing process (S5) in FIG. 12.

FIGS. 13 and 14 show the subroutine of the writing process (S5) in FIG. 12.

Referring to FIG. 13, in the writing process, CPU 110 accumulates (writes) writing data in memory 120 (S401), reads the accumulated writing data from memory 120 to perform the writing job (S403). Next, CPU 110 determines whether the remaining amount of memory 120 is more than or equal to the threshold value or not (S405).

In case that the remaining amount of memory 120 is more than or equal to the threshold value (YES at S405), CPU 110 steps in the process of step S407.

CPU 110 determines whether there are the unprocessed writing data or not (S407). At step S407, when there are the unprocessed writing data (YES at S407), CPU 110 steps in the process of step S401. On the other hand, at step S407, when there are not the unprocessed writing data (NO at S407). CPU 110 returns to the main flowchart.

At step S405, when the remaining amount of memory 120 is less than the threshold value (NO at S405), CPU 110 confirms the status of RAID controller 150 (S409). CPU 150*a* of RAID controller 150 transmits the status in response to the request of CPU 110 (S451). After the process of step S409, CPU 110 steps in the process of step S411 in FIG. 14.

Referring to FIG. 14, CPU 110 determines whether the rebuilding processes are being executed or not, based on the status (S411).

At step S411, when the rebuilding processes are being executed (YES at S411), CPU 110 requests RAID controller 150 to stop the rebuilding processes (S413). CPU 150*a* of RAID controller 150 stops the rebuilding processes, in response to the request of CPU 110 (S453). After the process of step S413, CPU 110 accumulates (transfers) data in the necessary HDD (S415), and requests RAID controller 150 to restart the rebuilding processes (S417). Next, CPU 110 steps in the process of step S 407 in FIG. 13. CPU 150*a* of RAID controller 150 restarts the rebuilding processes in response to the request of CPU 110 (S455).

At step S411, when the rebuilding processes are not being executed (NO at S411), CPU 110 accesses the necessary HDD (S419), and steps in the process of step S 407 in FIG. 13.

Figure 15:
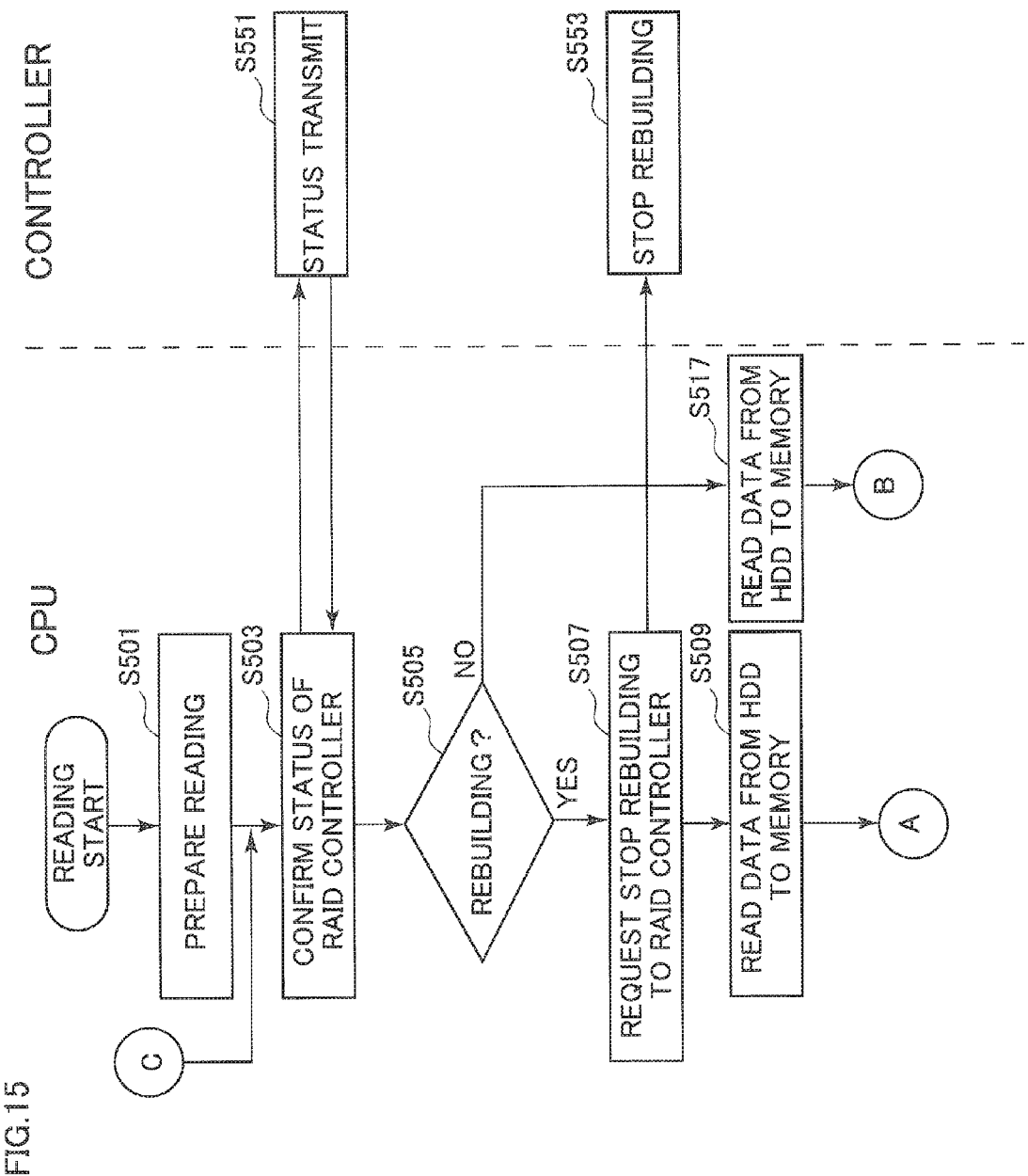
FIG. 15 shows the first part of the subroutine of the reading process (S7) in FIG. 12.
Figure 16:
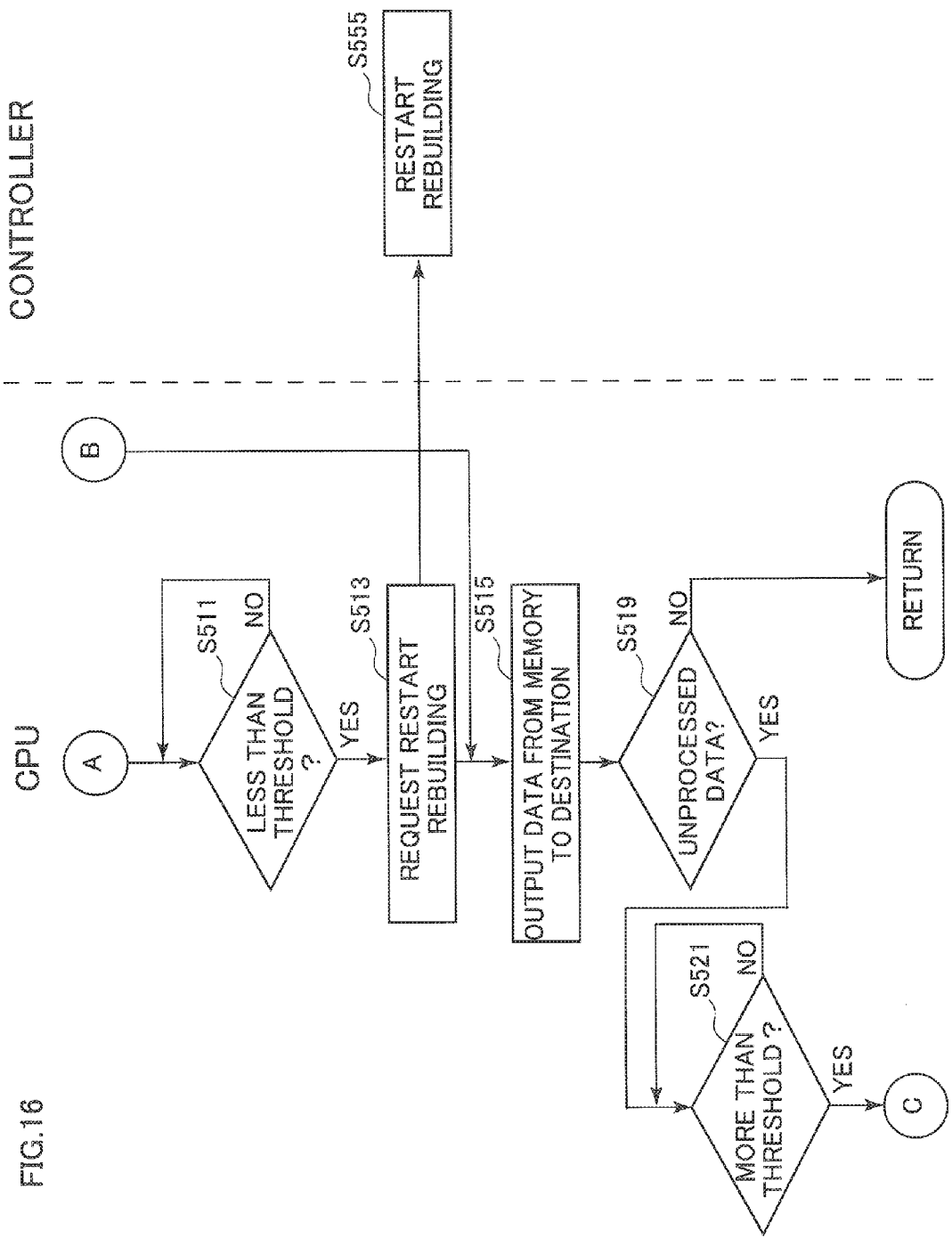
FIG. 16 shows the second part of the subroutine of the reading process (S7) in FIG. 12.

FIGS. 15 and 16 show the subroutine of the reading process (S7) in FIG. 12.

Referring to FIG. 15, in the reading process, CPU 110 prepares the reading (S501). For example, in case of a facsimile transmitting job, CPU 110 makes a call to the destination at step S501. Next, CPU 110 confirms the status of RAID controller 150 (S503). CPU 150*a* of RAID controller 150 transmits the status in response to the request of CPU 110 (S551). After the process of step S503, CPU 110 determines whether the rebuilding processes are being executed or not, based on the status (S505).

At step S505, when the rebuilding processes are being executed (YES at S505), CPU 110 requests RAID controller 150 to stop the rebuilding processes (S507). CPU 150*a* of RAID controller 150 stops the rebuilding processes in response to the request of CPU 110 (S553). After the process of step S507, CPU 110 reads data from the necessary HDD to memory 120 (S509), and steps in the process of step S511 in FIG. 16.

At step S505, when the rebuilding processes are not being executed (NO at S505), CPU 110 reads data from the necessary HDD to memory 120 (S517), and steps in the process of step S515 in FIG. 16.

Referring to FIG. 16, CPU 110 determines whether the remaining amount of memory 120 is less than the threshold value or not (S511).

At step S511, when the remaining amount of memory 120 is less than the threshold value (YES at S511), CPU 110 stops reading the data from the necessary HDD to memory 120, and requests RAID controller 150 to restart the rebuilding processes (S513). CPU 150*a* of RAID controller 150 restarts the rebuilding processes, in response to the request of CPU 110 (S555).

After the process of step S513, CPU 110 outputs the reading data accumulated in memory 120. Next, CPU 110 determines whether there are unprocessed reading data (reading data which were not read from the HDD) or not (S519).

At step S519, when there are unprocessed reading data (YES at S519), CPU 110 determines whether the remaining amount of memory 120 is more than or equal to the threshold value or not (S521). Until the remaining amount of memory 120 is more than or equal to the threshold value, CPU 110 continues the process of step S521.

At step S521, when the remaining amount of memory 120 is more than or equal to the threshold value (YES at S521), CPU 110 steps in the process of step S503 in FIG. 15.

At step S519, when there is no unprocessed reading data (NO at S519), CPU 110 returns to the main flowchart.

Since the structure of the image forming apparatus and behavior other than the above of this embodiment are similar to the first embodiment, the explanation is not repeated.

This embodiment has a similar effect to the first embodiment. In addition, when the image forming apparatus performs various jobs, the necessary HDD can be quickly accessed. Therefore, executing speed for jobs can be improved.

The Fifth Embodiment

In this embodiment, the case that RAID controller 150 informs CPU 110 of execution and completion of rebuilding processes without requests from CPU 110 will be explained. CPU 110 determines whether the rebuilding processes are being executed or not, based on the notification from RAID controller 150.

Figure 17:
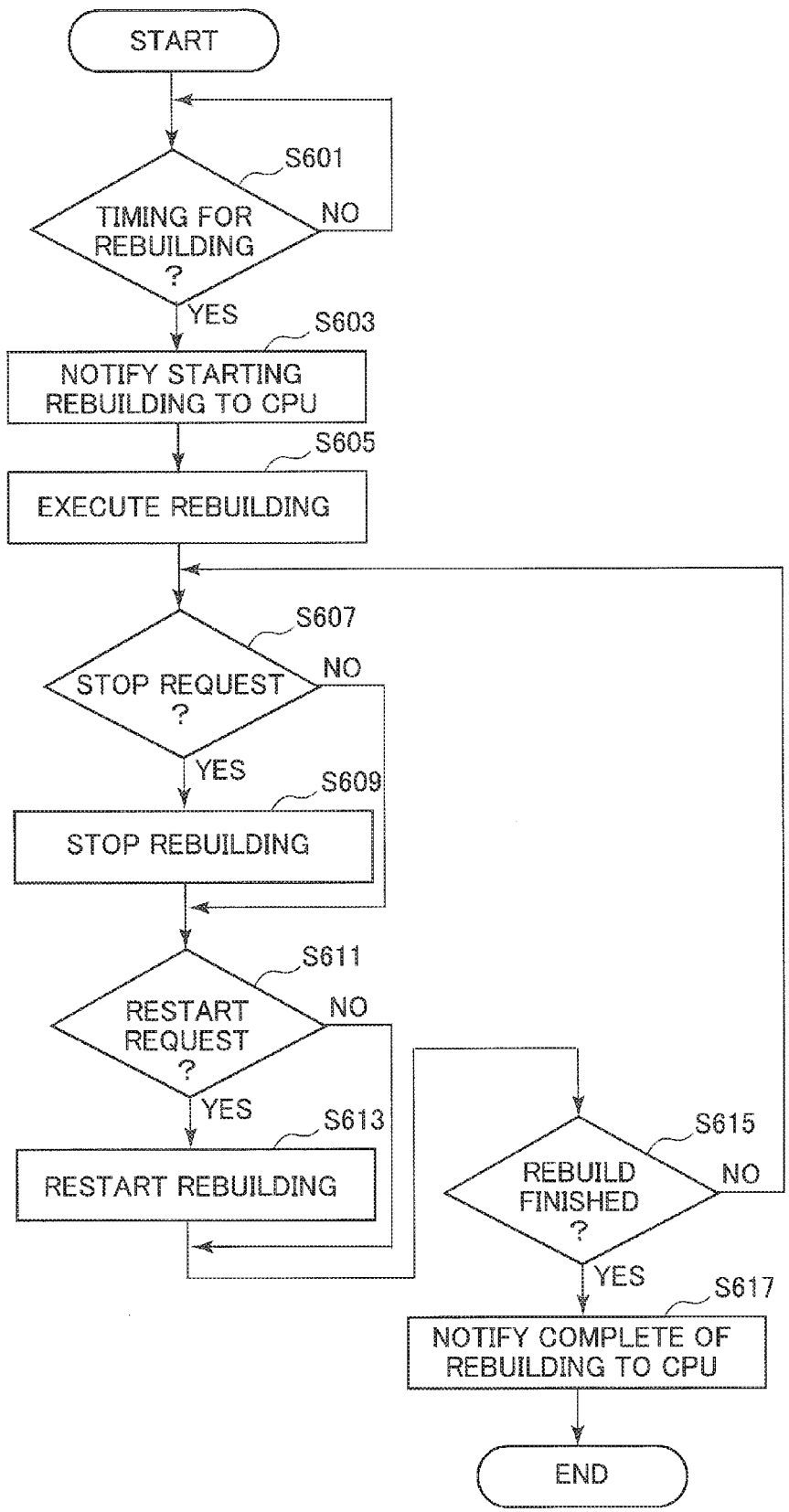
FIG. 17 shows a flowchart of behavior of RAID controller 150, according to the fifth embodiment of this invention.

FIG. 17 shows a flowchart of behavior of RAID controller 150, according to the fifth embodiment of this invention.

Referring to FIG. 17, CPU 150a of RAID controller 150 determines whether it is timing for starting rebuilding processes or not (S601). Until it is timing for starting rebuilding processes, CPU 150a continues the process of step S601.

At step S601, when it is timing for starting rebuilding processes (YES at S601), CPU 150a informs CPU 110 of starting rebuilding processes (S603), and executes (starts) the rebuilding processes (S605). Next, CPU 150a determines whether a stopping request for rebuilding processes is received from CPU 110 or not (S607).

At step S607, in case that a stopping request for rebuilding processes is received from CPU 110 (YES at S607), CPU 150a stops the rebuilding processes (S609). Next. CPU 150a determines whether a restarting request for the rebuilding processes from CPU 110 is received or not (S611).

At step S607, in case that a stopping request for rebuilding processes is not received from CPU 110 (NO at S607), CPU 150a steps in the process of step S 611.

At step S611, in case that a restarting request for the rebuilding processes from CPU 110 is received (YES at S611), CPU 150a restarts the rebuilding processes (S613). Next, CPU 150a determines whether the rebuilding processes are completed or not (S615).

At step S611, in case that a restarting request for the rebuilding processes from CPU 110 is not received (NO at S611), CPU 150a steps in the process of step S 615.

At step S615, in case that the rebuilding processes are completed (YES at S615), CPU 110 informs CPU 110 of the completion of the rebuilding processes (S617), and terminates the process.

At step S615, in case that the rebuilding processes are not completed (NO at S615), CPU 110 steps in the process of step S607.

Figure 18:
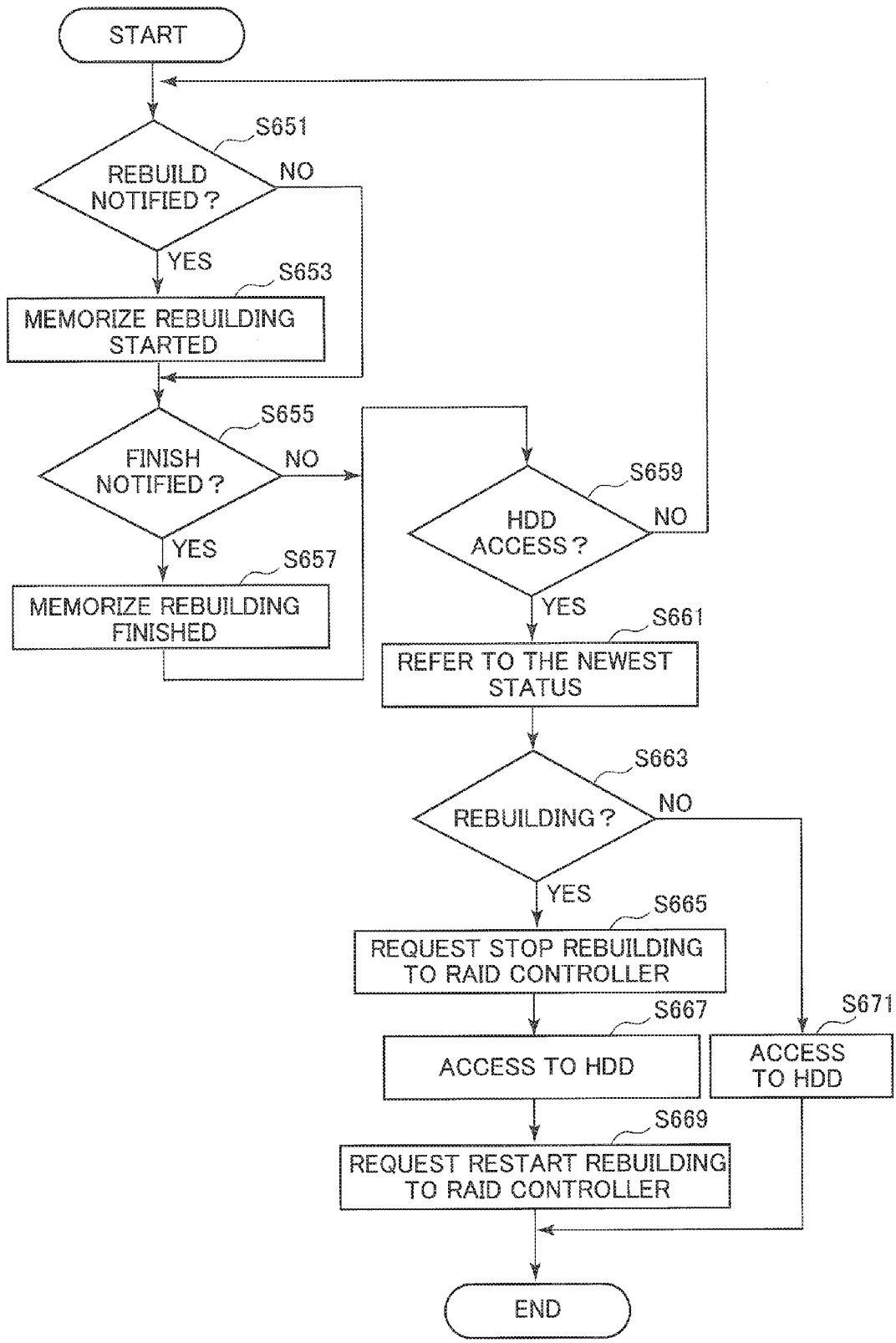
FIG. 18 shows a flowchart of behavior of CPU 110, according to the fifth embodiment of this invention.

FIG. 18 shows a flowchart of behavior of CPU 110, according to the fifth embodiment of this invention.

Referring to FIG. 18, CPU 110 determines whether notification for starting rebuilding processes from RAID controller 150 is received or not (S651).

At step S651, in case that the notification for starting rebuilding processes is received (YES at S651), CPU 110 memorizes the starting of the rebuilding processes (the rebuilding processes are being executed) in memory 120 (S653), and steps in the process of step S655. On the other hand, at step S651, in case that the notification for starting rebuilding processes is not received (NO at S651), CPU 110 steps in the process of step S655.

At step S655, CPU 110 determines whether the notification of completion of the rebuilding processes is received from RAID controller 150 or not (S655).

At step S655, in case that the notification of completion of the rebuilding processes is received (YES at S655), CPU 110 memorizes the completion of the rebuilding processes (the rebuilding processes are not being executed) in memory 120 (S657), and steps in the process of step S659. On the other hand, at step S655, in case that the notification of completion of the rebuilding processes is not received (NO at S655), CPU 110 steps in the process of step S659.

At step S659, CPU 110 determines whether there arises the necessity for accessing at least one of first HDD 151 and second HDD 152 or not (S659).

At step S659, when there arises the necessity for accessing at least one of first HDD 151 and second HDD 152 (YES at S659), CPU 110 confirms the newest memorized status of RAID controller 150 (S661), and determines whether the rebuilding processes are being executed or not (S663). On the other hand, at step S 659, when there does not arise the necessity for accessing first HDD 151 and second HDD 152 (NO at S659), CPU 110 steps in the process of step S651.

At step S663, in case that the rebuilding processes are being executed (YES at S663), CPU 110 requests RAID controller 150 to stop the rebuilding processes (S665). Next, CPU 110 accesses the necessary HDD (S667). Next, CPU 110 requests RAID controller 150 to restart the rebuilding processes (S669), and terminates the process.

At step S663, when the rebuilding processes are not being executed (NO at S663), the necessary HDD is accessed (S671), and the process is terminated.

Since the structure of the image forming apparatus and behavior other than the above of this embodiment are similar to the first embodiment, the explanation is not repeated.

According to this embodiment, CPU 110 comprehends the status of RAID controller 150 at all times. Herewith, when there arises the necessity for accessing a HDD, CPU 110 does not have to request RAID controller 150 to transmit the status.

The Sixth Embodiment

According to this embodiment, the case in which CPU 110 requests RAID controller 150 to stop or restart the rebuilding processes as needed basis, regardless of which the rebuilding processes are being executed or not, will be explained.

Figure 19:
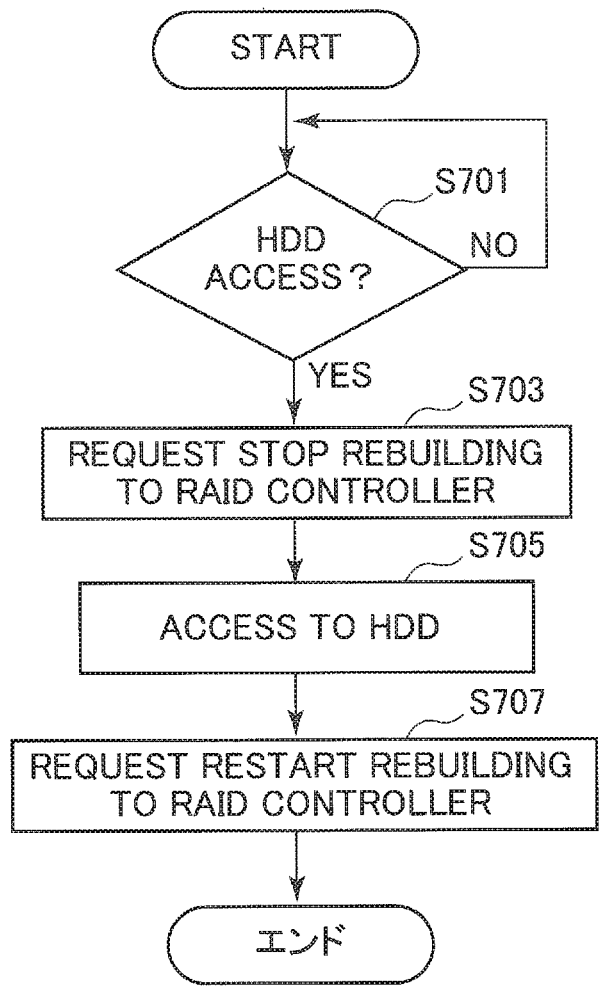
FIG. 19 shows a flowchart of behavior of CPU 110, according to the sixth embodiment of this invention.

FIG. 19 shows a flowchart of behavior of CPU 110, according to the sixth embodiment of this invention.

Referring to FIG. 19, CPU 110 determines whether there arises the necessity for accessing at least one of first HDD 151 and second HDD 152 or not (S701). Until there arises the necessity for accessing at least one of first HDD 151 and second HDD 152, CPU 110 continues the process of step S701.

At step S701, in case that there arises the necessity for accessing at least one of first HDD 151 and second HDD 152 (YES at S701), CPU 110 requests RAID controller 150 to stop the rebuilding processe (703), and accesses the necessary HDD (S705). Next, CPU 110 requests RAID controller 150 to restart the rebuilding processes (S707), and terminates the process.

During the rebuilding processes are not performed, when CPU 150a of RAID controller 150 received the request for stopping rebuilding processes, CPU 150a of RAID controller 150 ignores the request. In case that rebuilding process is not stopped (in case that rebuilding process has not been never performed, or in case that rebuilding process is being performed) and CPU 150a of RAID controller 150 received a request for restarting rebuilding processes, CPU 150a of RAID controller 150 ignores the request.

Since the structure of the image forming apparatus and behavior other than the above of this embodiment are similar to the first embodiment, the explanation is not repeated.

According to this embodiment, regardless of the status of RAID controller 150, CPU 110 requests CPU 150a to stop or restart rebuilding processes as needed basis. Herewith, when there arises the necessity for accessing a HDD, CPU 110 does not have to request RAID controller 150 to transmit the status.

The Seventh Embodiment

According to this embodiment, when RAID controller 150 receives a request for stopping rebuilding processes from CPU 110, waiting time between divided data piece writings is increased to stop the rebuilding processes.

Figure 20:
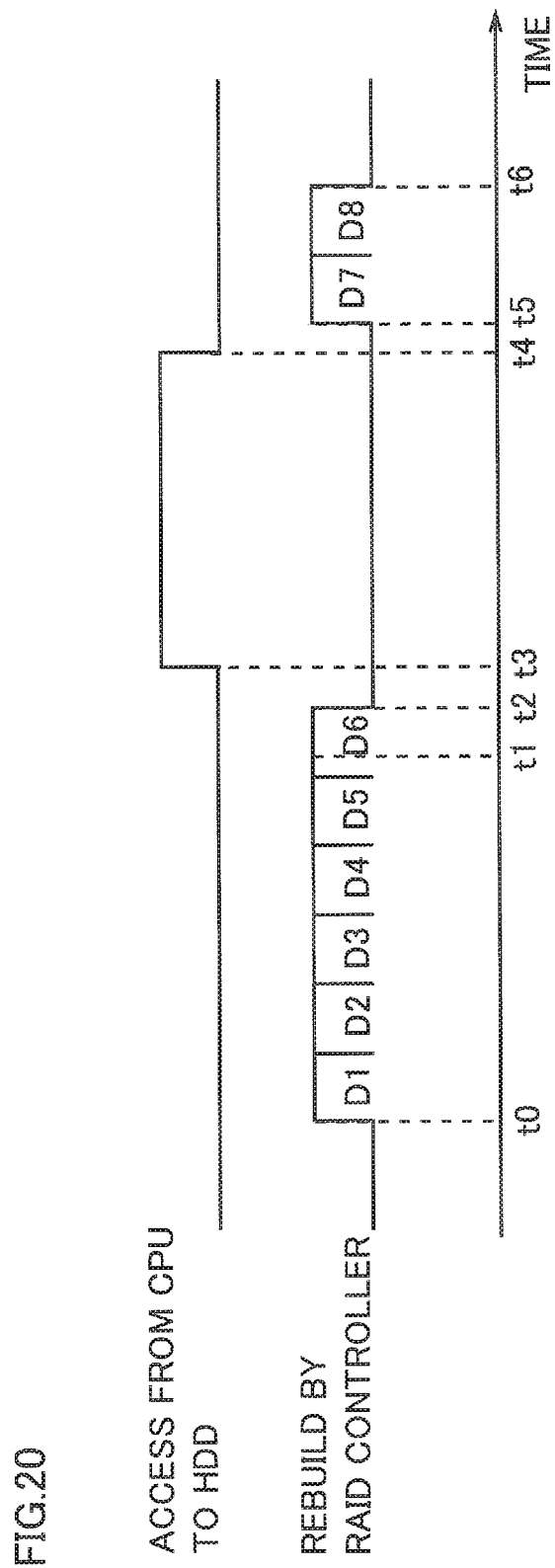
FIG. 20 shows a timing chart of behavior of the image forming apparatus, according to the seventh embodiment of this invention.

FIG. 20 shows a timing chart of behavior of the image forming apparatus, according to the seventh embodiment of this invention.

Referring to FIG. 20, at clock time t0, RAID controller 150 begins to rebuilding processes. RAID controller 150 divides data which is the object for the rebuilding processes into a plurality of divided data pieces D1, D2, D3 . . . D8, and writes (copies) each of the divided data pieces in second HDD 152 in this order. Each of the plurality of divided data pieces D1, D2, D3 . . . is the data which was made by dividing data which is the object for the rebuilding processes for each band.

When a request for stopping rebuilding processes is not received from CPU 110 (between clock time t0 and clock time t1), RAID controller 150 sets waiting time to zero. More specifically, after a writing a divided data piece is completed, RAID controller 150 begins to write the next divided data piece immediately.

At clock time t1, RAID controller 150 is writing divided data piece D6. At clock time t1, there arises the necessity for CPU 110 to access the HDD, and requests RAID controller 150 to stop the rebuilding processes. When the request was received, RAID controller 150 does not stop writing divided data piece D6 immediately and continues the writing.

At clock time t2, RAID controller 150 finishes writing divided data piece D6. In case that RAID controller 150 receives a request for stopping rebuilding processes from CPU 110, RAID controller 150 sets waiting time which is not zero (increases the waiting time), after the completion of the rebuilding processes for divided data piece D6 and before starting the rebuilding processes for divided data piece D7. In this instance, enough waiting time during which CPU 110 accesses the HDD is preferably set. CPU 110 may set the waiting time.

CPU 110 accesses the necessary HDD, immediately after clock time t2, from clock time t3 to clock time t4. At clock time t4, CPU 110 finishes accessing the HDD.

At clock time t5 when the waiting time has elapsed, RAID controller 150 restarts the rebuilding processes. RAID controller 150 restarts writing from divided data piece D7. RAID controller 150 may restart writing, returning to any of divided data pieces D1 to D5 for which the writing was finished. In this instance, a part or all of the divided data pieces D1 to D5 is overwritten.

When RAID controller 150 restarts the rebuilding processes, RAID controller 150 brings the waiting time back to zero. At clock time t6, RAID controller 150 terminates the rebuild process.

Since the structure of the image forming apparatus and behavior other than the above of this embodiment are similar to the first embodiment, the explanation is not repeated.

[Others]

Each of first HDD 151 and the second HDD in the above embodiments can be a fixed storage device. It can be replaced with a SSD.

The above embodiment can appropriately be combined. For example, in the fourth embodiment, RAID controller 150 may proactively stop and restart rebuilding processes or the like, as the third embodiment. According to this embodiment, a sophisticated image forming apparatus, a sophisticated control program for a image forming apparatus, a sophisticated controller, and a sophisticated control program for a controller can be provided.

The processes of above embodiments may be performed by software or a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to a device via communication lines like the internet. The processes explained in the above flowcharts and the description are executed by a CPU in line with the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a first and a second fixed storage devices,
   a controller to execute rebuilding processes in which data being stored in the first fixed storage device is copied to the second fixed storage device, when the second fixed storage device failed is restored,
   a CPU (Central Processing Unit) to access each of the first and the second fixed storage devices,
   a determination unit to determine whether the rebuilding processes are being executed or not, when there arises the necessity for accessing from the CPU to at least of the first and the second fixed storage devices,
   a priority acquire unit to acquire a priority of data which is an object for access by the CPU and a priority of data which is being processed under the rebuilding processes, when the determination unit determined that the rebuilding processes are being executed,
   a priority determination unit to determine whether the priority of data which is the object for access by the CPU is higher than the priority of data which is being processed under the rebuilding processes or not,
   a stop unit to stop the rebuilding processes, when the priority determination unit determined that the priority of data which is the object for access by the CPU is higher than the priority of data which is being processed under the rebuilding processes, and
   a restart unit to restart the rebuilding processes, when the access from the CPU to at least one of the fixed storage devices was finished.

2. The image forming apparatus according to claim 1, wherein
   the determination unit comprises:
   an information transmitting unit to transmit information for showing that the rebuilding processes are being executed or not, from the controller to the CPU, in response to the request from the CPU, when there arises the necessity for accessing from the CPU to at least of the fixed storage devices, and
   a CPU side determination unit to determine whether the rebuilding processes are being executed or not, by using the CPU, based on information received from the information transmitting unit, wherein
   the priority acquire unit comprises:
   a CPU reading unit to read data for which the rebuilding processes are being executed, by using the CPU, when the determination unit determined that the rebuilding processes are being execute, and
   a priority identifying unit to identify the priority of the data read by the CPU reading unit, by using the CPU, wherein
   the priority determination unit comprises:
   a CPU side priority determination unit to determine whether the priority of data which is an object for access by the CPU is higher than the priority of data which is being processed under the rebuilding processes or not, by using the CPU, based on the priority identified by the priority identifying unit, wherein
the stop unit comprises:
a stop requesting unit to request stopping the rebuilding processes, from the CPU to the controller, wherein
the restart unit comprises:
a restart requesting unit to request restarting the rebuilding processes, from the CPU to the controller.

3. The image forming apparatus according to claim 1, wherein
the determination unit comprises:
a controller side determination unit to determine whether the rebuilding processes are being executed or not, by using the controller, when there arises the necessity for accessing from the CPU to at least of the fixed storage devices, wherein
the priority acquire unit comprises:
a CPU side priority transmitting unit to transmit information for indicating the priority of data which is an object for access by the CPU, from the CPU to the controller, when the determination unit determined that the rebuilding processes are being executed, wherein
the priority determination unit comprises:
a controller side priority determination unit to determine whether the priority of data which is the object for access by the CPU is higher than the priority of data which is being processed under the rebuilding processes or not, by using the controller, based on information received from the CPU side priority transmitting unit.

4. The image forming apparatus according to claim 1, further comprises:
a start informing unit to inform starting of the rebuilding processes from the controller to the CPU, when the rebuilding processes is to be started, and
a completion informing unit to inform completion of the rebuilding processes from the controller to the CPU, when the rebuild process is completed, wherein
the determination unit comprises:
an informing determination unit to determine whether the rebuilding processes are being executed or not, by using the CPU, based on information from each of the start informing unit and the completion informing unit.

5. The image forming apparatus according to claim 1, wherein
the rebuilding processes is to divide data stored in the first fixed storage device into a plurality of divided data pieces, and to copy each of the plurality of divided data pieces into the second fixed storage device in series, wherein
the stop unit comprises:
a waiting time increment unit to increase waiting time which is time from completion of the rebuilding processes for a divided data piece which is being processed under the rebuilding processes among the plurality of divided data pieces, to starting the rebuilding processes for a next divided data piece, when there arises the necessity for accessing at least one of the first and the second fixed storage devices from the CPU.

6. The image forming apparatus according to claim 1, further comprises:
a writing job receiving unit to receive an instruction of performing a writing job for writing data into at least one of the fixed storage devices, a memory writing unit to write the writing data which is an object of the writing job into a memory, by using the CPU, when the instruction of performing the writing job was received, and
a first remaining amount determination unit to determine whether the amount of a spare capacity of the memory is less than a first threshold value or not, when the memory writing unit writes the writing data into the memory, wherein
the case that there arises the necessity for accessing at least one of the fixed storage devices from the CPU is the case that the first remaining amount determination unit determined that the amount of the spare capacity of the memory is less than the first threshold value.

7. The image forming apparatus according to claim 1, further comprises:
a reading job receiving unit to receive an instruction of performing a reading job for reading data from at least one of the fixed storage devices,
a reading unit to read the reading data which is an object of the reading job from the first or the second fixed storage device into the memory, by using the CPU, after the stop unit stopped the rebuilding processes, when the instruction of performing the reading job was received and
a second remaining amount determination unit to determine whether the amount of a spare capacity of the memory is less than a second threshold value or not, when the reading unit reads the reading data into the memory, wherein
the case that there arises the necessity for accessing at least one of the fixed storage devices from the CPU is the case that the instruction of performing the reading job is received, and
the case that the access from the CPU to at least one of the fixed storage devices was finished is the case that the second remaining amount determination unit determined that the amount of the spare capacity of the memory is less than the second threshold value.

8. The image forming apparatus according to claim 7, further comprises:
a third remaining amount determination unit to determine whether the amount of a spare capacity of the memory is more than or equal to a third threshold value or not, when the restart unit restarted the rebuilding processes and there is the reading data which was not output, and
a second stop unit to stop the rebuilding processes again when the third remaining amount determination unit determined that the amount of a spare capacity of the memory is more than or equal to the third threshold value.

9. The image forming apparatus according to claim 1, wherein
the controller can perform a mirroring process in which data stored in one of the first and the second fixed storage devices are copied into the other of the first and the second fixed storage devices.

10. A non-transitory computer-readable recording medium storing a controlling program for an image forming apparatus, wherein
the image forming apparatus comprises:
a first and a second fixed storage devices,
a controller to execute rebuilding processes in which data being stored in the first fixed storage device is copied to the second fixed storage device, when the second fixed storage device failed is restored, and a CPU (Central Processing Unit) to access each of the first and the second fixed storage devices, wherein the controlling program causing a computer to execute the steps of:

determine whether the rebuilding processes are being executed or not, when there arises the necessity for accessing from the CPU to at least of the first and the second fixed storage devices, acquire a priority of data which is an object for access by the CPU and a priority of data which is being processed under the rebuilding processes, when the rebuilding processes are being executed, determine whether the priority of data which is the object for access by the CPU is higher than the priority of data which is being processed under the rebuilding processes or not, stop the rebuilding processes, when the priority of data which is the object for access by the CPU is higher than the priority of data which is being processed under the rebuilding processes, and restart the rebuilding processes, when the access from the CPU to at least one of the fixed storage devices was finished.

11. A controller which communicates with a CPU (Central Processing Unit) which access each of the first and the second fixed storage devices, wherein the controller comprises:

a rebuild processor to execute rebuilding processes in which data being stored in the first fixed storage device is copied to the second fixed storage device, when the second fixed storage device failed is restored, a determination unit to determine whether the rebuilding processes are being executed or not, when there arises the necessity for accessing from the CPU to at least of the first and the second fixed storage devices, a priority acquire unit to acquire a priority of data which is an object for access by the CPU and a priority of data which is being processed under the rebuilding processes, when the determination unit determined that the rebuilding processes are being executed, a priority determination unit to determine whether the priority of data which is the object for access by the CPU is higher than the priority of data which is being processed under the rebuilding processes or not, a stop unit to stop the rebuilding processes, when the priority determination unit determined that the priority of data which is the object for access by the CPU is higher than the priority of data which is being processed under the rebuilding processes, and a restart unit to restart the rebuilding processes, when the access from the CPU to at least one of the fixed storage devices was finished.

12. A non-transitory computer-readable recording medium storing a controlling program for a controller, wherein the controller communicates with a CPU (Central Processing Unit) which access each of the first and the second fixed storage devices, wherein the controlling program causing a computer to execute the steps of:

execute rebuilding processes in which data being stored in the first fixed storage device is copied to the second fixed storage device, when the second fixed storage device failed is restored, determine whether the rebuilding processes are being executed or not, when there arises the necessity for accessing from the CPU to at least of the first and the second fixed storage devices, acquire a priority of data which is an object for access by the CPU and a priority of data which is being processed under the rebuilding processes, when the rebuilding processes are being executed, determine whether the priority of data which is the object for access by the CPU is higher than the priority of data which is being processed under the rebuilding processes or not, stop the rebuilding processes, when the priority of data which is the object for access by the CPU is higher than the priority of data which is being processed under the rebuilding processes, and restart the rebuilding processes, when the access from the CPU to at least one of the fixed storage devices was finished.

* * * * *